US011258650B2

(12) United States Patent
Zuo et al.

(10) Patent No.: US 11,258,650 B2
(45) Date of Patent: Feb. 22, 2022

(54) COMMUNICATION METHOD, COMMUNICATIONS APPARATUS, AND STORAGE MEDIUM

(71) Applicant: HUAWEI TECHNOLOGIES CO., LTD., Guangdong (CN)

(72) Inventors: Tianjian Zuo, Shenzhen (CN); Sen Zhang, Shenzhen (CN)

(73) Assignee: Huawei Technologies Co., Ltd., Guangdong (CN)

(*) Notice: Subject to any disclaimer, the term of this patent is extended or adjusted under 35 U.S.C. 154(b) by 17 days.

(21) Appl. No.: 16/726,604

(22) Filed: Dec. 24, 2019

(65) Prior Publication Data
US 2020/0136885 A1 Apr. 30, 2020

Related U.S. Application Data

(63) Continuation of application No. PCT/CN2018/092454, filed on Jun. 22, 2018.

(30) Foreign Application Priority Data

Jun. 30, 2017 (CN) .......................... 201710526780.7

(51) Int. Cl.
*H04L 27/36* (2006.01)
*H04L 25/03* (2006.01)
*H04L 27/01* (2006.01)

(52) U.S. Cl.
CPC ...... *H04L 27/361* (2013.01); *H04L 25/03866* (2013.01); *H04L 27/01* (2013.01)

(58) Field of Classification Search
CPC .. H04B 10/5116; H04B 5/0062; H04B 10/40; H04L 1/0052; H04L 1/0071; H04L 27/3881; G06F 10/005; H03L 7/0991
See application file for complete search history.

(56) References Cited

U.S. PATENT DOCUMENTS 9,485,121 B2 11/2016 Dorman et al.
2003/0123569 A1 7/2003 McLaughlin
(Continued)

FOREIGN PATENT DOCUMENTS

CN 103140768 A 6/2013
CN 105959064 A 9/2016
(Continued)

OTHER PUBLICATIONS

Dabiri, "Enabling Improved DSP Based Receivers for 100G Backplane," Applied Micro IEEE 802.3 Interim, 802.3bj Task Force, XP055437432, Sep. 1, 2011, 16 pages.
(Continued)

*Primary Examiner* — Iqbal Zaidi
(74) *Attorney, Agent, or Firm* — Fish & Richardson P.C.

(57) ABSTRACT

A communication method, a communications apparatus, and a storage medium are disclosed, to reduce a probability that consecutive bit errors occur in a communications system. A received to-be-sent signal is modulated to obtain a modulated signal, and N rounds of operations are further performed on the modulated signal to obtain an encoded signal. An output of the $1^{st}$-round operation in the N rounds of operations is determined based on the modulated signal and an output that is of the $N^{th}$-round operation and that is processed by a first delay circuit, and an output of the $i^{th}$-round operation in the N rounds of operations is determined based on an output of the $(i-1)^{th}$-round operation and an output that is of the $N^{th}$-round operation and that is processed by a second delay circuit, where i is an integer greater than 1 and less than or equal to N.

17 Claims, 15 Drawing Sheets

(56) References Cited

U.S. PATENT DOCUMENTS

| | | | |
|---|---|---|---|
| 2005/0175081 A1 | 8/2005 | Zhidkov | |
| 2007/0025475 A1* | 2/2007 | Okunev | G06K 7/10356 375/343 |
| 2011/0052216 A1 | 3/2011 | Jiang et al. | |
| 2012/0136669 A1* | 5/2012 | Hu | G10L 19/24 704/500 |
| 2014/0140389 A1 | 5/2014 | Chen | |
| 2014/0369398 A1 | 12/2014 | Yu et al. | |
| 2016/0211939 A1 | 7/2016 | Yu et al. | |
| 2018/0034549 A1* | 2/2018 | Kikuchi | H04B 10/40 |

FOREIGN PATENT DOCUMENTS

| | | |
|---|---|---|
| EP | 2362077 A2 | 8/2011 |
| JP | 2004266804 A | 9/2004 |
| JP | 2012060359 A | 3/2012 |
| KR | 20050079345 A | 8/2005 |
| WO | 2006001301 A1 | 1/2006 |
| WO | 2013101583 A1 | 7/2013 |

OTHER PUBLICATIONS

Extended European Search Report issued in European Application No. 18825262.1 dated Apr. 15, 2020, 10 pages.

Kossel et al., "Feedback delay reduction of Tomlinson-Harashima precoder in 14 nm CMOS via pipelined MAC units operated entirely with CSA arithmetic," Electronics Letters, vol. 52, No. 23, XP006073649, Nov. 10, 2016, pp. 1906-1908.

Kossel et al., "A 10 GB / s 8-Tap 6b 2-PAM / 4-PAM Tomlinson-Harashima Precoding Transmitter for Future Memory-Link Applications in 22-nm SOI CMOS", IEEE Journal of Solid-State Circuits, No. 48, vol. 12, Dec. 4, 2013, 17 pages.

Weng et al., "Performance analysis of M-PAM signalling with Tomlinson Harashima precoding over ISI channels", Global Telecommunications Conference, 2002. GLOBECOM 02. IEEE, Mar. 26, 2003, 4 pages.

IEEE P802.3bs™/D3.0 Draft Standard for Ethernet Amendment: Media Access Control Parameters, Physical Layers and Management Parameters for 200 GB/s and 400 GB/s Operation, Jan. 10, 2017, 387 pages.

PCT International Search Report and Written Opinion in International Application No. PCT/CN2018/092454, dated Sep. 6, 2019, 19 pages (With English Translation).

Alic et al., "Joint Statistics and MLSD in Filtered Incoherent High-Speed Fiber-Optic Communications," Journal of Lightwave Technology, vol. 28, No. 10, May 15, 2010, 9 pages.

Office Action issued in Korean Application No. 2020-7002504 dated Apr. 6, 2021, 12 pages (with English translation).

CTTC et al., "LTE MIMO OTA Round Robin test results," TSG-RAN Working Group 4 (Radio) Meeting #64bis, R4-125015, Santa Rosa, CA, USA, Oct. 8-12, 2012, 11 pages.

Office Action issued in Chinese Application No. 201710526780.7 dated Apr. 2, 2021, 4 pages.

Office Action issued in Japanese Application No. 2019-572620 dated Feb. 2, 2021, 10 pages (with English translation).

* cited by examiner

Adder (configured to perform an addition operation on a received signal)

Modulo calculator (configured to perform a modulo operation on M by using an input signal)

COMMUNICATION METHOD, COMMUNICATIONS APPARATUS, AND STORAGE MEDIUM

CROSS-REFERENCE TO RELATED APPLICATIONS

This application is a continuation of International Application No. PCT/CN2018/092454, filed on Jun. 22, 2018, which claims priority to Chinese Patent Application No. 201710526780.7, filed on Jun. 30, 2017, The disclosures of the aforementioned applications are hereby incorporated by reference in their entireties.

TECHNICAL FIELD

Embodiments of this application relate to the communications field, and in particular, to a communication method, a communications apparatus, and a storage medium.

BACKGROUND

As a network wideband requirement rapidly increases, an operator accelerates deployment of a 100 G/400 G metropolitan area network to meet a user requirement. A short-distance optical module requires low costs, small occupation space, and low power consumption. Therefore, a simplest intensity-modulation direct-detection technology is usually used in optical communication. For example, a 4-level pulse amplitude modulation (PAM4) signal is characterized by simple implementation and low power consumption, and is one of optimal short-distance interconnection solutions. The PAM4 signal is a signal in a 4-level modulation format, and bandwidth of the PAM4 signal is only half of that of an OOK signal at a same bit rate.

However, in an actual situation, costs of high-bandwidth opto-electronic and electro-optic components are relatively high. Therefore, to improve system performance, people often use a low-bandwidth component to transmit a high-rate signal, and use an auxiliary equalizer in a sending apparatus or a receiving apparatus to perform equalization processing on data. In this case, a signal sent by the sending apparatus is affected by a low-pass filtering effect of the component and becomes a distorted signal with a smear, and therefore the signal produces strong intersymbol interference (151) in the receiving apparatus. A receive end equalizer is used to eliminate ISI in a system as much as possible. For example, the signal may be directly equalized as a 4-level signal for output by using a feed forward equalizer (FFE). In this case, the FFE is equivalent to a high-pass filter, and can cancel a low-pass filtering effect of a channel. However, an additive white Gaussian noise (AWGN) introduced by the channel is also filtered by the FFE, and a power spectrum of the noise is no longer flat, and consequently the FFE outputs a non-whitening noise.

When equalization and signal demodulation are performed on a channel with ISI and an AWGN, disposing a maximum likelihood sequence detection (MLSD) module based on a Euclidean distance in the receiving apparatus is considered as a solution with optimal performance. An operating principle of the MLSD module is as follows: A received signal is compared with all possible transmit sequences, and a path with a shortest Euclidean distance is used as a demodulation sequence. If a non-whitening degree of a noise input to the MLSD module is relatively strong, performance of the MLSD module may be degraded, and consequently consecutive bit errors may probably occur in an output result of the receiving apparatus.

SUMMARY

Embodiments of this application provide a communication method, a communications apparatus, and a storage medium, to reduce a probability that consecutive bit errors occur in a communications system.

According to a first aspect, an embodiment of this application provides a communication method, including: modulating, by a sending apparatus, a received to-be-sent signal to obtain a modulated signal, where the modulation may be electrical modulation; and performing, by the sending apparatus, N rounds of operations on the modulated signal to obtain an encoded signal, where an output of the $1^{st}$-round operation in the N rounds of operations is determined based on the modulated signal and an output that is of the $N^{th}$-round operation and that is processed by a first delay module, and an output of the $i^{th}$-round operation in the N rounds of operations is determined based on an output of the $(i-1)^{th}$-round operation and an output that is of the $N^{th}$-round operation and that is processed by a second delay module, where N is a positive integer, and i is an integer greater than 1 and less than or equal to N. It can be learned from the foregoing example that this embodiment of this application provides a basis for subsequent cooperation with a receiving apparatus to reduce a probability that consecutive bit errors occur in a communications system, thereby improving overall system performance.

This embodiment of this application is applicable to a plurality of scenarios. For example, the to-be-sent signal may be modulated by using a modulation scheme such as PAM-M modulation or QAM-E. The QAM-E modulation includes two channels of modulation, and each channel of modulation may also be referred to as the PAM-M modulation, where M and E may be integers greater than 1.

In an optional implementation, a latency between an output and an input of the first delay module is one symbol period. To be specific, a signal output by the first delay module is a signal that is one symbol period earlier than an input signal of the first delay module. That is, an input of the $1^{st}$ operation module in N operation modules includes two parts: the modulated signal and an encoded signal that is output by an encoding module before one symbol period. The encoded signal that is output by the encoding module before one symbol period may be an encoded signal corresponding to a signal that is one symbol period earlier than the to-be-sent signal.

In another optional implementation, a latency between an output and an input of the second delay module is i symbol periods. To be specific, a signal output by the second delay module is a signal that is i symbol periods earlier than an input signal of the second delay module. That is, an input of the $i^{th}$ operation module in the N operation modules includes two parts: an output of a previous operation module of the it operation module and an encoded signal that is output by an encoding module before i symbol periods. The encoded signal that is output by the encoding module before i symbol periods may be an encoded signal corresponding to a signal that is i symbol periods earlier than the to-be-sent signal.

To improve system flexibility, in an optional implementation, the output of the $1^{st}$-round operation is obtained by performing a first operation on the modulated signal and the output that is of the $N^{th}$-round operation and that is processed by the first delay module and performing a modulo operation on a result of the first operation, and the output of the $i^{th}$-round operation is obtained by performing a first operation on the output of the $(i-1)^{th}$-round operation and the output that is of the $N^{th}$-round operation and that is processed by the second delay module and performing a modulo operation on a result of the first operation. In another optional implementation, the output of the $1^{st}$-round operation is obtained by performing an exclusive OR operation on the modulated signal and the output that is of the $N^{th}$-round operation and that is processed by the first delay module, and the output of the $i^{th}$-round operation is obtained by performing an exclusive OR operation on the output of the $(i-1)^{th}$-round operation and the output that is of the $N^{th}$-round operation and that is processed by the second delay module.

To further improve the system performance, in an optional implementation, the modulating, by a sending apparatus, a received to-be-sent signal includes: performing, by the sending apparatus, M-level pulse amplitude modulation PAM-M modulation on the received to-be-sent signal, where the modulo operation includes performing a modulo operation on M by using the result of the first operation.

In an optional implementation, N is determined based on M and a target level quantity of a receive end equalizer in a receiving apparatus, so that the probability that consecutive bit errors occur in the communications system can be further reduced.

In an optional implementation, after the sending apparatus obtains the encoded signal, the method further includes: if determining that a noise non-whitening degree in a to-be-restored signal received by the receiving apparatus is greater than a degree threshold, sending, by the sending apparatus, the encoded signal to the receiving apparatus; or if determining that a noise non-whitening degree in a to-be-restored signal received by the receiving apparatus is not greater than a degree threshold, sending, by the sending apparatus, the modulated signal to the receiving apparatus, so that the probability that consecutive bit errors occur in the communications system can be further reduced.

In an optional implementation, that the sending apparatus determines whether the noise non-whitening degree in the to-be-restored signal received by the receiving apparatus is greater than the degree threshold includes: receiving indication information that is used to indicate a value relationship between the noise non-whitening degree in the to-be-restored signal received by the receiving apparatus and the degree threshold; and determining, according to the indication information, whether the noise non-whitening degree in the to-be-restored signal received by the receiving apparatus is greater than the degree threshold, so that the probability that consecutive bit errors occur in the communications system can be further reduced.

According to a second aspect, an embodiment of this application provides a communication method, including: performing, by a receiving apparatus, maximum likelihood detection processing on a received to-be-restored signal to obtain an after-detection signal; and performing, by the receiving apparatus, processing based on the after-detection signal and an after-detection signal that is processed by a third delay module, to obtain a decoded signal.

In an optional implementation, a latency between an output and an input of the third delay module is N symbol periods, and N is determined based on M and a target level quantity of a receive end equalizer in the receiving apparatus; and M-level pulse amplitude modulation PAM-M modulation is performed on the to-be-restored signal in a sending apparatus. For related content of N and M, refer to the description of the foregoing embodiment. This is not limited in this embodiment of this application. That is, an output that is of a maximum likelihood detection module and that is processed by the third delay module is an after-detection signal output by the detection module in the first several symbol periods.

In an optional implementation, that the receiving apparatus performs processing based on the after-detection signal and the after-detection signal that is processed by the third delay module, to obtain the decoded signal includes: performing, by the receiving apparatus, a second operation on the after-detection signal and the after-detection signal that is processed by the third delay module, and performing a modulo operation on a result of the second operation to obtain the decoded signal. In another optional implementation, the receiving apparatus performs P rounds of exclusive OR operations on the after-detection signal and the after-detection signal that is processed by the third delay module, and uses a signal output in the $P^{th}$-round exclusive OR operation as the decoded signal, where an output of the $1^{st}$-round exclusive OR operation in the P rounds of exclusive OR operations is determined based on the after-detection signal and an after-detection signal that is processed by a fourth delay module, and an output of the $j^{th}$-round exclusive OR operation in the P rounds of exclusive OR operations is determined based on an output of the $(j-1)^{th}$-round exclusive OR operation and an after-detection signal that is processed by a fifth delay module, where j is an integer greater than 1 and less than or equal to P, and P is a positive integer.

In an optional implementation, a latency between an output and an input of the fourth delay module is one symbol period. To be specific, a signal output by the fourth delay module is a signal that is one symbol period earlier than an input signal of the fourth delay module. In an optional implementation, a latency between an output and an input of the fifth delay module is j symbol periods. To be specific, a signal output by the fifth delay module is a signal that is j symbol periods earlier than an input signal of the fifth delay module, so that a probability that consecutive bit errors occur in a communications system can be reduced.

In an optional implementation, the modulo operation includes performing a modulo operation on M by using the result of the second operation, so that the probability that consecutive bit errors occur in the communications system can be further reduced.

To better improve system performance, in an optional implementation, after the receiving apparatus determines the decoded signal, the method further includes: if a noise non-whitening degree in the to-be-restored signal received by the receiving apparatus is greater than a degree threshold, demodulating the decoded signal to obtain a restored signal; or if a noise non-whitening degree in the to-be-restored signal received by the receiving apparatus is not greater than a degree threshold, demodulating the after-detection signal to obtain a restored signal.

In an optional implementation, that the receiving apparatus determines whether the noise non-whitening degree in the to-be-restored signal received by the receiving apparatus is not greater than the degree threshold includes: performing, by the receiving apparatus, judgement processing on the to-be-restored signal to obtain an after-judgement signal; estimating, by the receiving apparatus, a noise whitening tap coefficient in the to-be-restored signal based on the after-judgement signal and the to-be-restored signal; and determining a value relationship between the noise non-whitening degree in the to-be-restored signal and the degree threshold based on a value relationship between the noise whitening tap coefficient and a judgement threshold.

To further improve the system performance, in an optional implementation, after the receiving apparatus determines the value relationship between the noise non-whitening degree in the to-be-restored signal and the degree threshold, the method further includes: sending, by the receiving apparatus to the sending apparatus, indication information that is used to indicate the value relationship between the noise non-whitening degree in the to-be-restored signal received by the receiving apparatus and the degree threshold.

According to a third aspect, corresponding to the communication methods in the first aspect and the second aspect, this application further provides a communications apparatus. The communications apparatus may be any sending apparatus or receiving apparatus that transmits data in a wireless manner, such as a communications chip, a terminal device, or a network device (for example, a base station). In a communication process, the sending apparatus and the receiving apparatus are relative concepts. In some communication processes, the communications apparatus may serve as the foregoing sending apparatus, but in some communication processes, the communications apparatus may serve as the foregoing receiving apparatus. For example, in downlink data transmission, the sending apparatus is a base station, and the corresponding receiving apparatus is a terminal device; in uplink data transmission, the sending apparatus is a terminal device, and the corresponding receiving apparatus is a base station; in D2D (device to device) data transmission, the sending apparatus is UE, and the corresponding receiving apparatus may also be UE. A communication manner is not limited in this application.

Either of the sending apparatus and the receiving apparatus may be a terminal device or a communications chip that may be used in the terminal device, or a network device or a communications chip that may be used in the network device.

According to a fourth aspect, an embodiment of this application provides a communications apparatus, and the communications apparatus is configured to perform the method in any possible implementation of the first aspect, or is configured to perform the method in any possible implementation of the second aspect.

In a design, the communications apparatus is a communications chip.

Optionally, the communications apparatus further includes modules that may be configured to perform the communication method in any possible implementation of the first aspect, or the communications apparatus further includes modules that may be configured to perform the communication method in any possible implementation of the second aspect.

According to a fifth aspect, a communications apparatus is provided, including a processor and a memory. The memory is configured to store a computer program, and the processor is configured to invoke the computer program from the memory and run the computer program, so that the communications apparatus performs the method in any possible implementation of the first aspect, or the communications apparatus performs the method in any possible implementation of the second aspect.

Optionally, there are one or more processors, and there are one or more memories.

Optionally, the memory may be integrated with the processor, or the memory and the processor are disposed separately.

Optionally, the communications apparatus further includes a transmit machine (transmitter) and a receive machine (receiver).

According to a sixth aspect, a system is provided, and the system includes the foregoing sending apparatus and the foregoing receiving apparatus.

According to a seventh aspect, a computer program product is provided. The computer program product includes a computer program (may also be referred to as code or an instruction). When the computer program runs, a computer is enabled to perform the method in any possible implementation of the first aspect, or the computer is enabled to perform the method in any possible implementation of the second aspect.

According to an eighth aspect, a computer readable medium is provided. The computer readable medium stores a computer program (may also be referred to as code or an instruction). When the computer program runs on a computer, the computer is enabled to perform the method in any possible implementation of the first aspect, or the computer is enabled to perform the method in any possible implementation of the second aspect.

DESCRIPTION OF EMBODIMENTS

It should be understood that, the technical solutions in the embodiments of this application may be applied to various communications systems, such as a global system for mobile communications (GSM for short), a code division multiple access (CDMA for short) system, a wideband code division multiple access (WCDMA for short) system, a general packet radio service (GPRS for short), a long term evolution (LTE for short) system, an LTE frequency division duplex (FDD for short) system, an LTE time division duplex (TDD for short) system, a universal mobile telecommunications system (UMTS for short), a worldwide interoperability for microwave access (WiMAX for short) communications system, and a 5G communications system.

Figure 1:
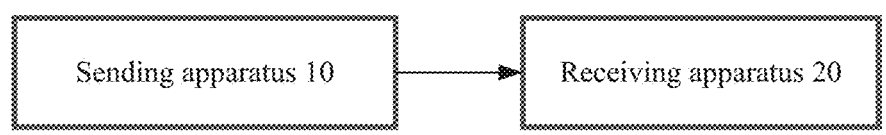
FIG. 1 is a schematic diagram of a system architecture according to an embodiment of this application.

FIG. 1 is an example of a schematic diagram of a system architecture according to an embodiment of this application. As shown in FIG. 1, the system architecture applicable to the embodiments of this application includes a sending apparatus 10 and a receiving apparatus 20 connected to the sending apparatus 10 in a wired, wireless, or another manner. In this embodiment of this application, the sending apparatus 10 may obtain a to-be-sent original signal from a user, a server, or the like, perform specific processing such as modulation and coding on this type of original signal, and then send a processed signal to the receiving apparatus 20. After performing specific processing on the received signal, the receiving apparatus 20 restores the original signal sent by the sending apparatus 10. When data is sent from a terminal device to a network device, the sending apparatus 10 may be the terminal device, and the receiving apparatus 20 may be the network device. When data is sent from a network device to a terminal device, the sending apparatus 10 may be the network device, and the receiving apparatus 20 may be the terminal device.

The terminal device may be user equipment (UE), an access terminal device, a subscriber unit, a subscriber station, a mobile station, a mobile console, a remote station, a remote terminal device, a mobile device, a user terminal device, a terminal device, a wireless communications apparatus, a user agent, or a user apparatus. The access terminal device may be a cellular phone, a cordless phone, a session initiation protocol (SIP for short) phone, a wireless local loop (WLL for short) station, a personal digital assistant (PDA for short), a handheld device having a wireless communication function, a computing device, another processing device connected to a wireless modem, a vehicle-mounted device, a wearable device, a terminal device in a future 5G network, or the like.

The network device may be a device configured to communicate with the sending apparatus. For example, the network device may be a base transceiver station (BTS for short) in a GSM system or a CDMA system, may be a NodeB (NB for short) in a WCDMA system, or may be an evolved NodeB (eNB or eNodeB for short) in an LTE system. Alternatively, the network device may be a relay station, an access point, a vehicle-mounted device, a wearable device, a network side device in a future 5G network, a network device in a future evolved PLMN network, or the like.

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Figure 2:
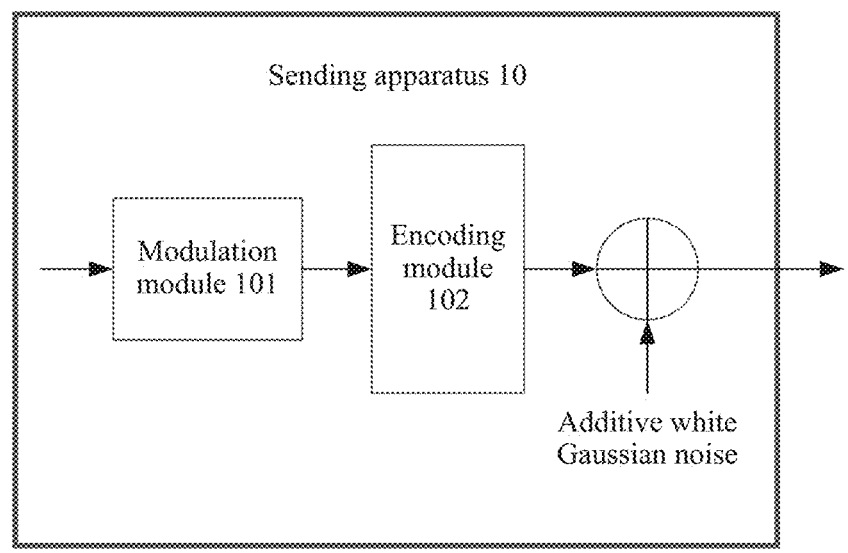
FIG. 2 is a schematic structural diagram of a communications apparatus.

Based on the foregoing embodiment and a same concept, FIG. 2 is a schematic structural diagram of a communications apparatus according to an embodiment of this application. As shown in FIG. 2, the communications apparatus may be a chip or a circuit, for example, a chip or a circuit that may be disposed on the sending apparatus 10. The communications apparatus may correspond to the sending apparatus in this embodiment of this application. The communications apparatus may include a modulation module 101 and an encoding module 102.

The modulation module 101 is configured to modulate a received to-be-sent signal to obtain a modulated signal. In this embodiment of this application, the sending apparatus obtains to-be-sent original signals from a plurality of users, servers, or the like. In this embodiment of this application, specific processing may be performed on the original signal, and then a processed signal is input to the modulation module. For example, some processing such as forward error correction coding and Gray coding may be performed on the original signal to obtain a to-be-sent signal, and the to-be-sent signal is input to the modulation module for modulation and coding.

The modulation module 101 in this embodiment of this application modulates the to-be-sent signal. Specifically, the modulation may be electrical modulation. This embodiment of this application is applicable to a plurality of scenarios. For example, the modulation module 101 may modulate the to-be-sent signal by using a modulation scheme such as PAM-M modulation or QAM-E. The QAM-E modulation includes two channels of modulation, and each channel of modulation may also be referred to as the PAM-M modulation, where M and E may be integers greater than 1.

The encoding module 102 is configured to process the modulated signal by using N operation modules that are sequentially connected, to obtain an encoded signal, and send the encoded signal, where an input of the $1^{th}$ operation module in the N operation modules is connected to an output of the modulation module and an output, processed by a first delay module, of the $N^{th}$ operation module, and an input of the $i^{th}$ operation module in the N operation modules is connected to an output of the $(i-1)^{th}$ operation module and an output, processed by a second delay module, of the $N^{th}$ operation module, where N is a positive integer, and i is an integer greater than 1 and less than or equal to N.

Encoding in the encoding module 102 may be electrical encoding. Optionally, encoding in the modulation module 101 may be performed to increase a single-symbol information amount, and encoding in the encoding module 102 may be performed to increase system robustness.

In an optional implementation, a latency between an output and an input of the first delay module is one symbol period. To be specific, a signal output by the first delay module is a signal that is one symbol period earlier than an input signal of the first delay module. That is, the input of the $1^{st}$ operation module in the N operation modules includes two parts: the modulated signal and an encoded signal that is output by the encoding module before one symbol period. The encoded signal that is output by the encoding module before one symbol period may be an encoded signal corresponding to a signal that is one symbol period earlier than the to-be-sent signal.

In another optional implementation, a latency between an output and an input of the second delay module is i symbol periods. To be specific, a signal output by the second delay module is a signal that is i symbol periods earlier than an input signal of the second delay module. That is, the input of the $i^{th}$ operation module in the N operation modules includes two parts: an output of a previous operation module of the $i^{th}$ operation module and an encoded signal that is output by the encoding module before i symbol periods. The encoded signal that is output by the encoding module before i symbol periods may be an encoded signal corresponding to a signal that is i symbol periods earlier than the to-be-sent signal.

One symbol period in this embodiment of this application is a latency between two adjacent symbols, and the symbol may be a PAM symbol, a QAM symbol, or the like. This is not limited in this embodiment of this application. The symbol period may be preset, may be random, or may be generated according to a specific rule.

The to-be-sent signal described in this embodiment of this application may be a binary bit sequence. The binary bit sequence may be binary bit quantized information such as a text, audio, or a video. In an optional implementation, a bit sequence with a specific length that is received by the modulation module may be referred to as a to-be-sent signal at a moment. The specific length may be preset, or may be determined based on an actual situation. For example, in 4-level modulation, a binary 2-bit signal may correspond to a 4-level to-be-sent signal.

For example, the encoding module 102 sequentially receives a modulated signal corresponding to a to-be-sent signal 1, a modulated signal corresponding to a to-be-sent signal 2, a modulated signal corresponding to a to-be-sent signal 3, and a modulated signal corresponding to a to-be-sent signal 4. N is set to 3, 1, 2, 3, and 4 in the to-be-sent signal 1, the to-be-sent signal 2, the to-be-sent signal 3, and the to-be-sent signal 4 are merely identifiers. A latency between two adjacent to-be-sent signals sequentially received by the encoding module 102 is set to one symbol period.

In this example, for the modulated signal corresponding to the to-be-sent signal 2, a signal that is one symbol period earlier than the to-be-sent signal 2 is the to-be-sent signal 1. In this way, an output of the $1^{st}$ operation module may be obtained based on the modulated signal corresponding to the to-be-sent signal 2 and an encoded signal generated by the to-be-sent signal 1. For another operation module, because there is only one encoded signal previously, an output of the another operation module may use the encoded signal generated by the to-be-sent signal 1, or may use a random sequence or a null sequence as an output, processed by a delay module, of the $N^{th}$ operation module.

In this example, for the modulated signal corresponding to the to-be-sent signal 4, a signal output by the $1^{st}$-round operation may be obtained by performing an operation on the modulated signal and an encoded signal corresponding to the to-be-sent signal 3. It can be learned that the encoded signal corresponding to the to-be-sent signal 3 is obtained by processing an encoded signal corresponding to the $4^{th}$-round operation by using the delay module. In this case, a latency between an input and an output of the delay module is one symbol period. A signal output by the $2^{nd}$-round operation may be obtained by performing an operation on the signal output by the $1^{st}$-round operation and an encoded signal corresponding to the to-be-sent signal 2. It can be learned that the encoded signal corresponding to the to-be-sent signal 2 is obtained by processing the encoded signal corresponding to the $4^{th}$-round operation by using the delay module. In this case, a latency between an input and an output of the delay module may be two symbol periods. A signal output by the $3^{rd}$-round operation may be obtained by performing an operation on the signal output by the $2^{nd}$-round operation and an encoded signal corresponding to the to-be-sent signal 1. A signal output by the $4^{th}$-round operation may be obtained by performing an operation on the signal output by the $3^{rd}$-round operation and a null sequence, a preset sequence, the encoded signal corresponding to the to-be-sent signal 1, the encoded signal corresponding to the to-be-sent signal 2, or the encoded signal corresponding to the to-be-sent signal 3.

It can be learned from the foregoing example that, in this embodiment of this application, the encoding module 102 performs a series of processing on the modulated signal output by the modulation module, and changes an association between adjacent sequences based on the modulated signal output by the modulation module and the first several encoded signals output by the encoding module, to reduce a probability that consecutive bit errors occur in a communications system. This further provides a basis for subsequent cooperation with a receiving apparatus to further reduce the probability that consecutive bit errors occur in the communications system, thereby improving overall system performance.

Particularly, in a scenario in which channel bandwidth is relatively wide, some components in the sending apparatus and the receiving apparatus, for example, components such as an equalizer in the sending apparatus and an equalizer in the receiving apparatus, each produces a relatively strong filtering effect. In this case, an additive white Gaussian noise generated by a channel is severely low-pass filtered after passing through the equalizer and becomes a non-whitening noise. Performance of MLSD may be degraded if the non-whitening noise is input, and a large quantity of consecutive bit errors may occur. In such strong ISI, a problem of the consecutive bit errors is particularly serious. The foregoing solution provided in this embodiment of this application can exert a better effect in this scenario, that is, provide a basis for cooperation with the receiving apparatus to reduce a correlation between adjacent signal sequences, and provide a basis for cooperation with the receiving apparatus to reduce the probability that consecutive bit errors occur in the communications system, thereby improving system performance.

Each of the N operation modules in the encoding module performs one round of operation, and an operation performed by each operation module may include one operation or a combination of a plurality of operations, for example, any one or a combination of an addition operation, a modulo operation, and an exclusive OR operation. In an optional implementation, each of the N operation modules includes a first arithmetic logic unit and a modulo calculator that are sequentially connected, an input of the first arithmetic logic unit is an input of the operation module, and an output of the modulo calculator is an output of the operation module. In other words, the output of the $1^{st}$-round operation is obtained by performing a first operation on the modulated signal and the output that is of the $N^{th}$-round operation and that is processed by the first delay module and performing a modulo operation on a result of the first operation, and the output of the $i^{th}$-round operation is obtained by performing a first operation on the output of the $(i-1)^{th}$-round operation and the output that is of the $N^{th}$-round operation and that is processed by the second delay module and performing a modulo operation on a result of the first operation. Further, in an optional implementation, the modulation module is specifically configured to perform M-level pulse amplitude modulation (PAM-M) modulation on the received to-be-sent signal; and the modulo calculator is configured to perform a modulo operation on M by using an input signal of the modulo calculator. That is, the modulo operation includes performing the modulo operation on M by using the result of the first operation, where M is a level quantity of the to-be-sent signal received by the modulation module. The first operation may have a plurality of options. For example, the first operation is a one-level subtraction operation or a multi-level subtraction operation, or is a subtraction operation and a modulo operation.

In this embodiment of this application, to further reduce a requirement of a high-rate signal on component bandwidth, the modulation module 101 may perform polybinary encoding on the received to-be-sent signal. Polybinary encoding is an encoding scheme in which ISI is controlled to be introduced into some code elements, but there is no ISI in remaining code elements. In this scheme, frequency band utilization can be maximized theoretically. Because introduced intercode interference is known, a sampling value of the code element can be obtained by removing the intercode interference from a final sampling result. This can improve frequency band utilization.

Figure 3:
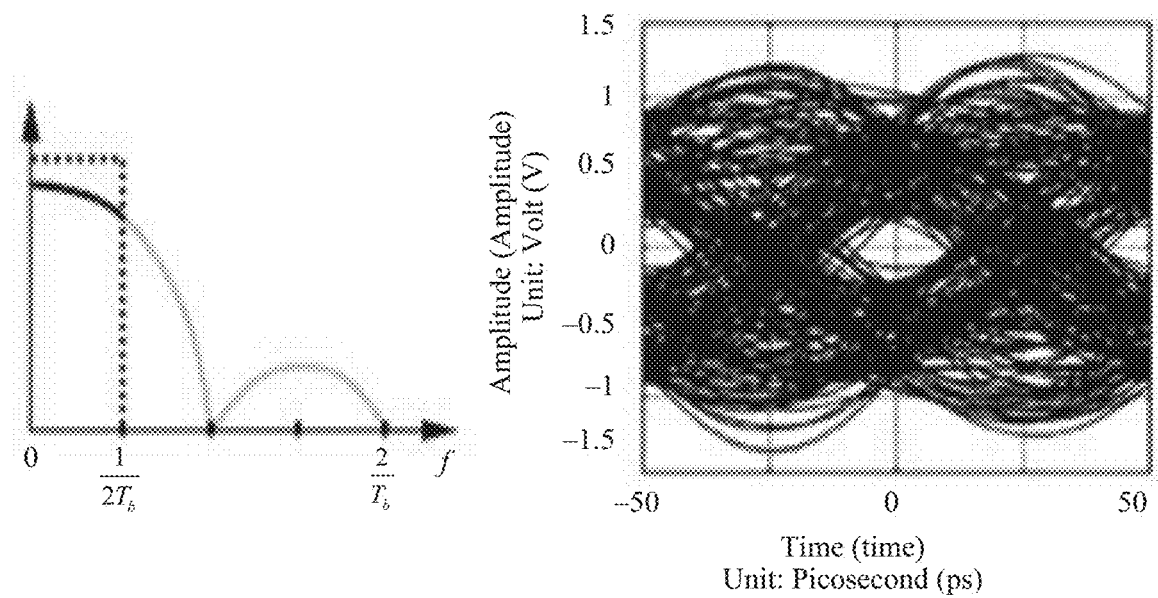
FIG. 3 is a signal spectrum diagram and a Nyquist filtering eye diagram that are corresponding to a common non-return-to-zero signal.
Figure 4:
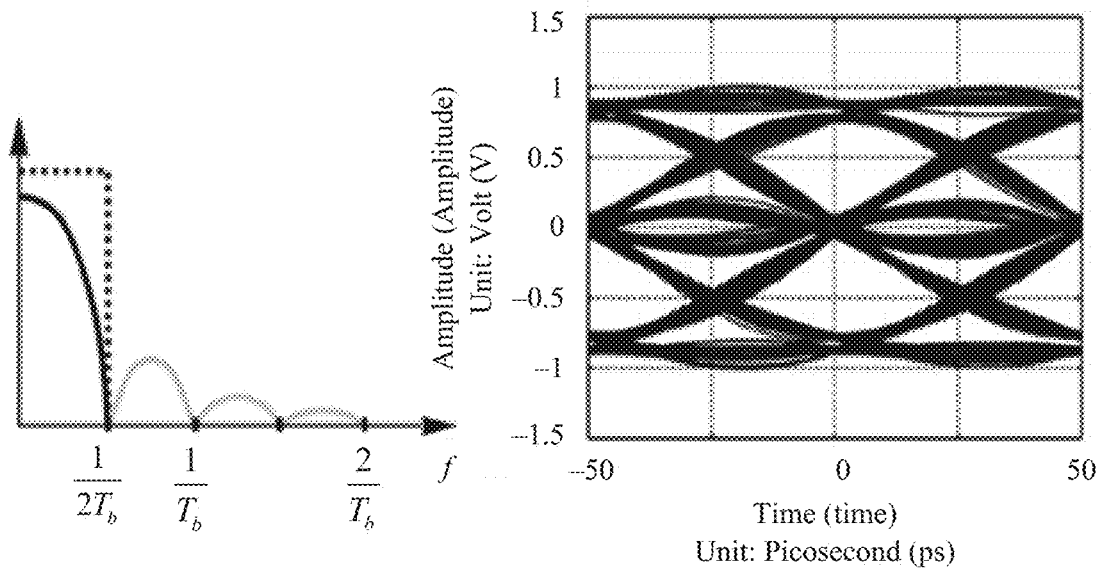
FIG. 4 is a signal spectrum diagram and a Nyquist filtering eye diagram that are corresponding to a duobinary signal.

FIG. 3 is a signal spectrum diagram (the left side of FIG. 3) and a Nyquist filtering eye diagram (the right side of FIG. 3) that are corresponding to a common non-return-to-zero (NRZ) signal, and FIG. 4 is a signal spectrum diagram (the left side of FIG. 4) and a Nyquist filtering eye diagram (the right side of FIG. 4) that are corresponding to a duobinary signal (the duobinary signal is also referred to as a polybinary signal encoded with a memory length of 1). As shown by dotted lines in the signal spectrum diagram in FIG. 3 and the signal spectrum diagram in FIG. 4, Nyquist filtering is filtering performed on a signal by using a low-pass filter whose bandwidth is measured by a Baud rate. It can be learned from FIG. 3 and FIG. 4 that in the signal spectrum diagrams, a first zero crossing point of a spectral main lobe of the NRZ signal is at a position corresponding to the Baud rate, and a first zero crossing point of a spectral main lobe of the duobinary signal is at a position corresponding to half of the Baud rate. It can be learned from the Nyquist filtering eye diagrams that, after the NRZ signal is filtered, the eye diagram is already very closed due to ISI introduced by narrowband filtering, but the eye diagram of the duobinary signal is still obviously open after the narrowband filtering. Because a main lobe of the duobinary signal is just within a Nyquist filtering range, the ISI introduced by the narrowband filtering is not obvious. It can be learned from FIG. 3 and FIG. 4 that polybinary encoding can improve frequency band utilization.

In this embodiment of this application, if the modulation module 101 performs PAM-M modulation, the signal received by the modulation module 101 is a to-be-sent PAM-4 signal. A process in which the modulation module 101 performs polybinary encoding on the to-be-sent PAM-4 signal may be represented by using Formula (1):

$$r_k = s_k + s_{k-1} \qquad \text{Formula (1)}$$

In Formula (1), $r_k$ is an output 7-level polybinary PAM-4 signal, $s_k$ is the to-be-sent PAM-4 signal input to the modulation module 101, and $s_{k-1}$ is a to-be-sent PAM-4 signal that is one symbol period earlier than $s_k$ and that is input to the modulation module 101.

In Formula (1), it may be considered that the 7-level polybinary PAM-4 signal $r_k$ is obtained after the to-be-sent PAM-4 signal $s_k$ input to the modulation module 101 is filtered by a low-pass filter $h_1$ whose tap coefficient is [1 1], where $h_1 = [1\ 1]$.

Correspondingly, the process of performing polybinary encoding on the to-be-sent PAM-4 signal may be alternatively represented by using Formula (2):

$$g_k = s_k + s_{k-1} + s_{k-2} + s_{k-3} \qquad \text{Formula (2)}$$

In Formula (2), $g_k$ is a 13-level polybinary PAM-4 signal, $s_k$ is the to-be-sent PAM-4 signal input to the modulation module 101, $s_{k-1}$ is a to-be-sent PAM-4 signal that is one symbol period earlier than $s_k$ and that is input to the modulation module 101, $s_{k-2}$ is a to-be-sent PAM-4 signal that is two symbol periods earlier than $s_k$ and that is input to the modulation module 101, and $s_{k-3}$ is a to-be-sent PAM-4 signal that is three symbol periods earlier than $s_k$ and that is input to the modulation module 101.

In Formula (2), it may be considered that the 13-level polybinary PAM-4 signal $g_k$ is obtained after the to-be-sent PAM-4 signal $s_k$ is filtered by a low-pass filter $h_2$ whose tap coefficient is [1 2 1], where $h_2 = [1\ 1\ 1\ 1]$.

Figure 5:
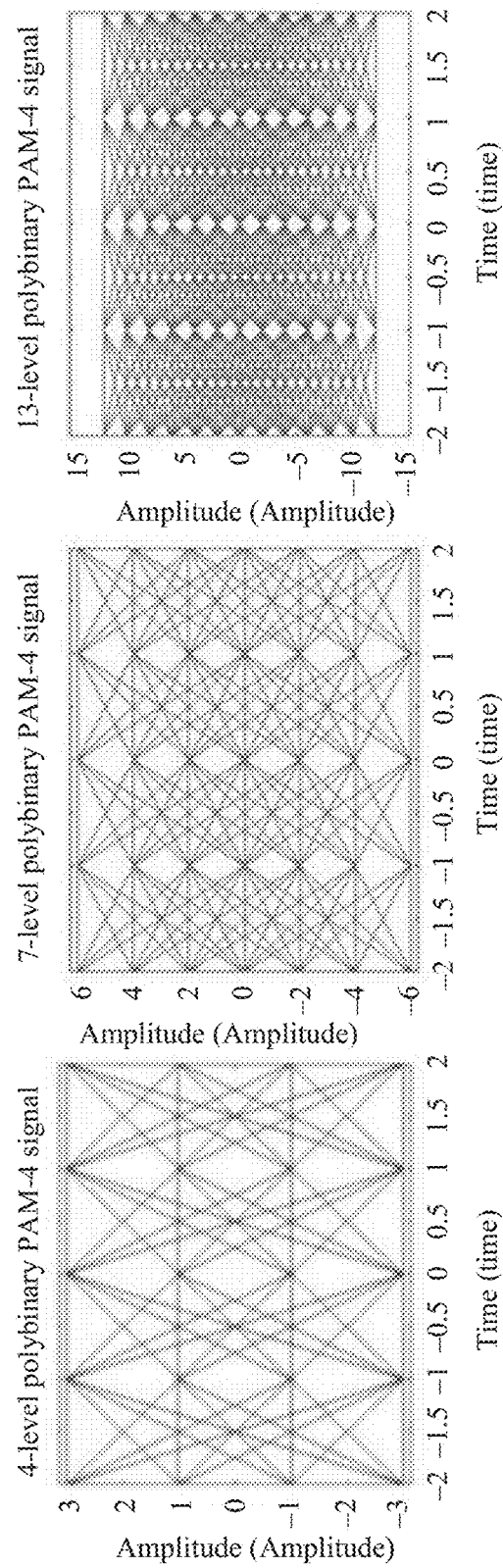
FIG. 5 sequentially shows Nyquist filtering eye diagrams corresponding to a 4-level PAM-4 signal, a 7-level polybinary PAM-4 signal, and a 13-level polybinary PAM-4 signal from left to right.

FIG. 5 sequentially shows Nyquist filtering eye diagrams corresponding to a 4-level PAM-4 signal, a 7-level polybinary PAM-4 signal, and a 13-level polybinary PAM-4 signal from left to right. The 7-level polybinary PAM-4 signal and the 13-level polybinary PAM-4 signal may be restored to original 4-level PAM-4 signals after being processed by an MLSD module on a receiving apparatus 20 side. Optionally, a process in which the receiving apparatus decodes a polybinary signal is represented by using Formula (3) and Formula (4). For parameters in Formula (3) and Formula (4), refer to the content of Formula (1) and Formula (2).

$$s_k = r_k \otimes h_1^{-1} \qquad \text{Formula (3)}$$

$$s_k = g_k \otimes h_2^{-1} \qquad \text{Formula (4)}$$

Figure 6:
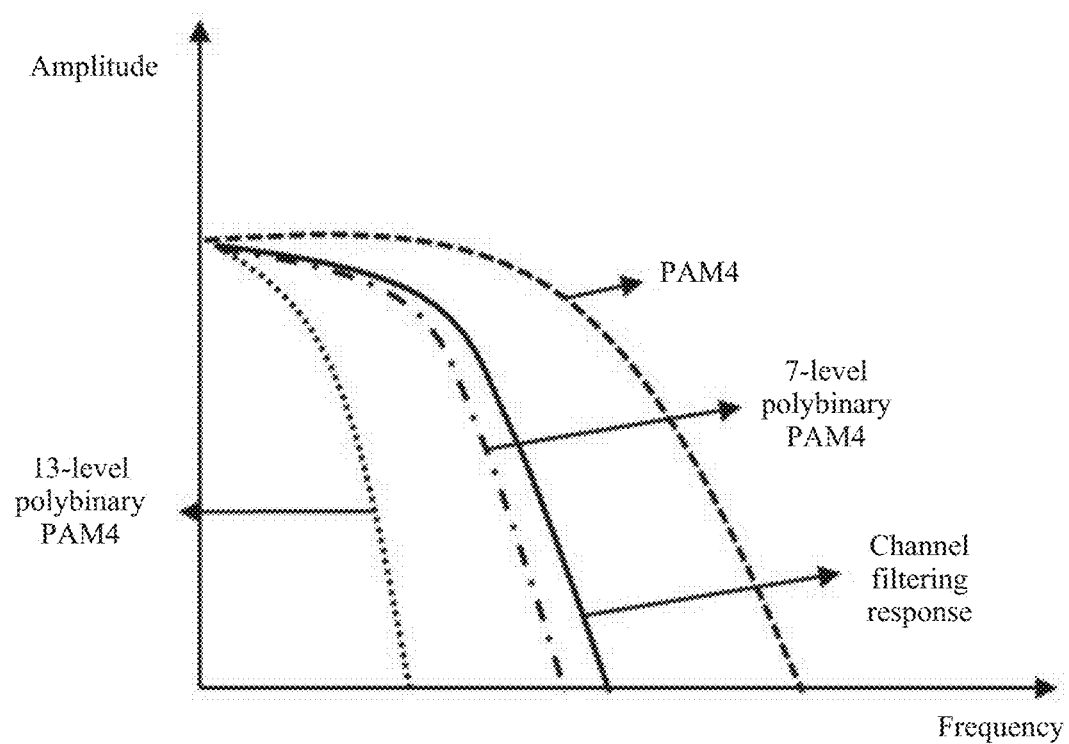
FIG. 6 is a schematic diagram of different requirements of polybinary PAM-4 signals of different levels on a channel frequency response.

Further, because a sending apparatus, a transmission link, and a receiving apparatus on a transport channel each produce a filtering effect, in an optional implementation, a transmission system may adaptively choose, based on a low-pass filtering characteristic of the link and by using a feed forward equalizer (FFE) with a digital filtering function, whether to add polybinary encoding and add polybinary encoding of a specific level. FIG. 6 is an example of a schematic diagram of different requirements of polybinary PAM-4 signals of different levels on a channel frequency response. As shown in FIG. 6, requirements of the polybinary PAM4 signals of different levels on the channel frequency response are different. To enable a signal to obtain relatively good transmission performance in a specific transport channel, in an optional implementation, L-level polybinary encoding that is closest to a requirement of a channel frequency response curve is selected, where L is a target level quantity of a receive end equalizer. Further, a low-pass or high-pass filtering function of an FFE in a receiving apparatus is adjusted to multiply the channel frequency response by a frequency response of a device in the receiving apparatus (for example, the receive end equalizer in the receiving apparatus, and the receive end equalizer is the FFE in this example for description), to match a frequency response required by L-level polybinary encoding. In time domain, convolution of an impulse response of the FFE and a channel impulse response is equal to an impulse response required by L-level polybinary encoding. As shown in FIG. 6, a dashed line with broadest bandwidth represents a system frequency response required by PAM-4 signal transmission, a dotted-dashed line represents a system frequency response required by 7-level polybinary PAM-4 signal transmission, a dotted line represents a system frequency response required by 13-level polybinary PAM-4 signal transmission, and a solid line represents a system frequency response. According to the foregoing description, in an optional implementation, 7-level polybinary PAM-4 encoding may be selected for transmission. Optionally, the FFE in the receiving apparatus is set to low-pass filtering, and a frequency response corresponding to each part may be represented by using Formula (5):

$$h_{1,2} = h_1 \otimes h_{Eq} \qquad \text{Formula (5)}$$

In Formula (5), $h_{1,2}$ is a target impulse response corresponding to Formula (1) or Formula (3), $h_t$ is an impulse response of a link end-to-end system and may be obtained by measuring an end-to-end frequency response H(f) and performing Fourier transformation on H(f), and $h_{Eq}$ is a low-pass filtering impulse response introduced by an equalizer (which may be a transmit end equalizer in a sending apparatus and/or the receive end equalizer in the receiving apparatus).

If it is determined that 7-level polybinary PAM-4 encoding is selected for transmission, after multi-level mapping is performed on a data bit stream of a to-be-sent signal, an ideal 4-level PAM-4 signal is generated. Optionally, if the sending apparatus 10 further includes a shaping filter and the transmit end equalizer, a 4-level polybinary PAM-4 signal may be filtered by the shaping filter to implement frequency spectrum compression of the signal. An eye diagram of a receive end signal is obviously degraded due to a low-pass characteristic of a channel and an introduced white Gaussian noise. If the receiving apparatus includes the receive end equalizer, a degraded 4-level polybinary PAM-4 signal is sent to the receive end equalizer and then 7-level equalization is performed on the signal, and a signal output by the receive end equalizer is sent to an MLSD module in the receiving apparatus for ISI cancellation and then 4-level determining is performed on the signal. The MLSD module outputs a standard PAM4 signal for demapping. In this case, the data bit stream of the original to-be-sent signal can be restored.

It can be learned from Formula (5) that low-pass filtering caused by a channel and low-pass filtering caused by an equalizer need to be cascaded to achieve a low-pass filtering effect of $h_1$ or $h_2$ in related content of Formula (1) and Formula (2). If channel bandwidth is relatively narrow, the transmit end equalizer and/or the receive end equalizer produce/produces a minimal low-pass filtering effect or even produce/produces no low-pass filtering effect. In this case, an additive white Gaussian noise generated by the channel does not have an obvious filtering effect after passing through the equalizer, and a whitening characteristic of the noise is still obvious. In other words, a non-whitening characteristic is not obvious. In this case, performance of the MLSD module in the receiving apparatus is relatively good, and a case in which consecutive bit errors are output is relatively rare. In this case, the solution provided in this embodiment of this application may be selected for use, for example, the to-be-sent signal is processed by using the encoding module 102, or in this case, the solution provided in this embodiment of this application is not used. In another case, if the channel bandwidth is relatively wide, the transmit end equalizer and/or the receive end equalizer need/needs to produce a relatively strong low-pass filtering effect. In this case, the additive white Gaussian noise generated by the channel is severely low-pass filtered after passing through the equalizer and becomes a non-whitening noise. Performance of the MLSD module may be degraded if the non-whitening noise is input, and a large quantity of consecutive bit errors occur. Therefore, the solution provided in this embodiment of this application can be used to reduce a correlation between adjacent sequences, thereby reducing a probability that consecutive bit errors occur in a communications system.

In this embodiment of this application, there may be one or more delay modules. In this embodiment of this application, first, second, third, fourth, and fifth in a first delay module, a second delay module, a third delay module, a fourth delay module, and a fifth delay module are merely used for differentiation, and do not constitute any limitation. For example, the third delay module may include the fourth delay module and the fifth delay module, and the fourth delay module may be the fifth delay module, or the fourth delay module may be one module included in the fifth delay module. Any two delay modules may be two different delay modules. The delay module in this embodiment of this application may be a logical delay module or a physical delay module. The delay module may be referred to as a delay module.

Figure 7:
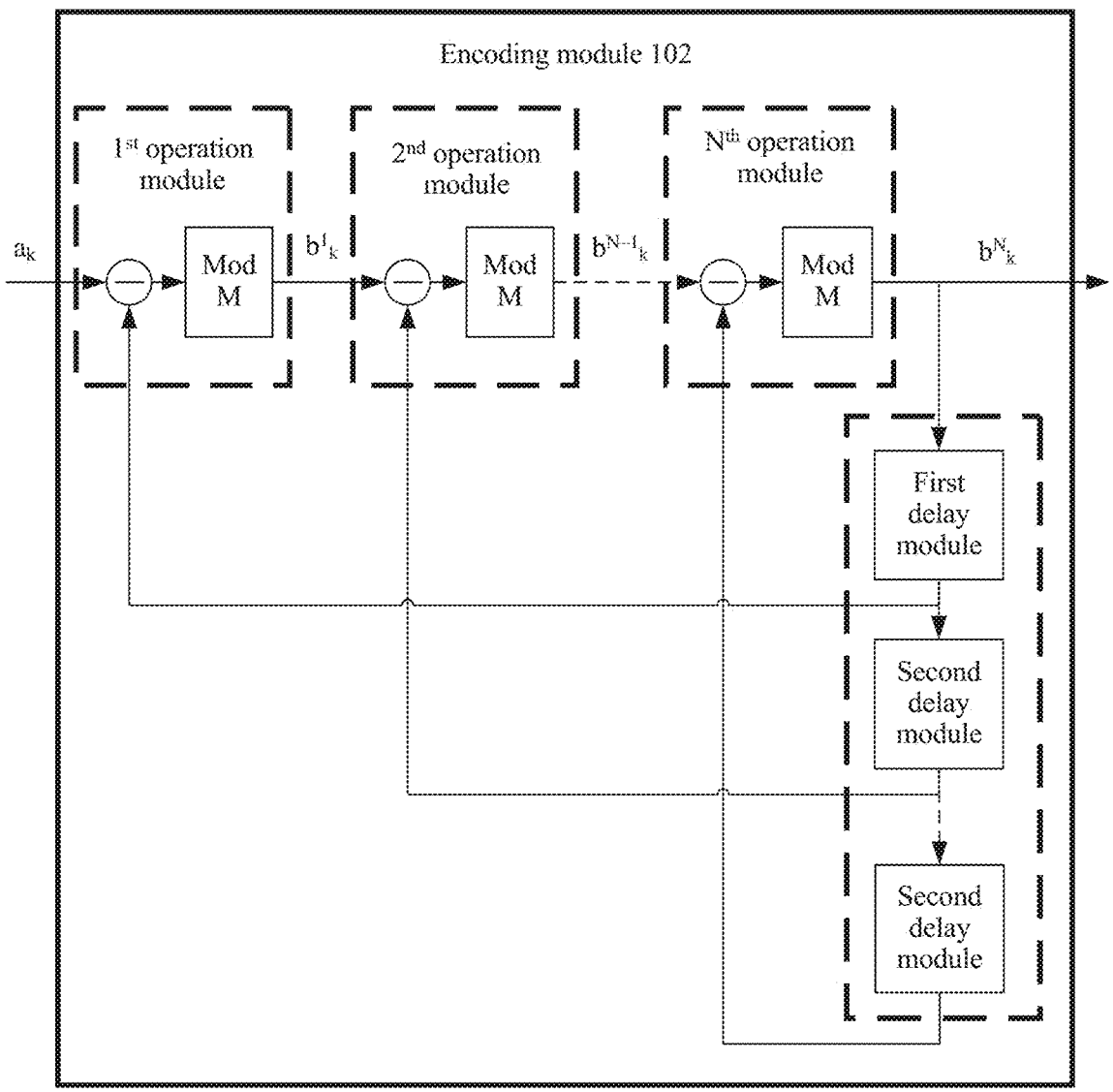
FIG. 7 is a schematic structural diagram of an encoding module according to an embodiment of this application.

FIG. 7 is an example of a schematic structural diagram of an encoding module according to an embodiment of this application. As shown in FIG. 7, an encoding module 102 correspondingly performs N rounds of operations, and each round of operation may be completed by a subtractor, a modulo calculator, and a delay module. The encoding module includes N subtractors, N modulo calculator, and N-level delay modules in total. A latency between an input and an output of each of the N delay modules may be one symbol period. In this way, a delay module connected to the $1^{st}$ operation module may be referred to as a first delay module, and remaining delay modules may be referred to as second delay modules. As shown in FIG. 7, input precoder_in ($a_k$) of the encoding module 102 is from a modulated signal output by the modulation module 101 in FIG. 2 and an encoded signal $b_k^N$ output by the encoding module 102. A relationship between a value $b_k^N$ of Precoder_out and a value $a_k$ of Pecoder_in may be represented by using Formula (6):

$$b_k^1 = (a_k - b_{k-1}^N) \mathrm{mod} M; \qquad \text{Formula (6)}$$
$$b_k^2 = (b_k^1 - b_{k-2}^N) \mathrm{mod} M$$
$$\ldots$$
$$b_k^j = (b_k^{j-1} - b_{k-j}^N) \mathrm{mod} M$$
$$\ldots$$
$$b_k^N = (b_k^{N-1} - b_{k-N}^N) \mathrm{mod} M$$

In Formula (6), $a_k$ is the modulated signal.

$b_k^1$ is an output signal of the $1^{st}$ operation module, $b_k^2$ is an output signal of the $2^{nd}$ operation module, $b_k^{i-1}$ is an output signal of the $(i-1)^{th}$ operation module, $b_k^i$ is an output signal of the $i^{th}$ operation module, and $b_k^N$ is an output signal of the $N^{th}$ operation module, namely, the encoded signal.

$b_{k-1}^N$ is an encoded signal that is one symbol period earlier than $b_k^N$, $b_{k-2}^N$ is an encoded signal that is two symbol periods earlier than $b_k^N$, $b_{k-i}^N$ is an encoded signal that is i symbol periods earlier than $b_k^N$, and $b_{k-N}^N$ is an encoded signal that is N symbol periods earlier than $b_k^N$.

A value range of i is (1, N], and mod is a modulo operation.

Formula (6) may be alternatively described as Formula (7):

$$\text{Precoder\_out}(t) = \{[\text{precoder\_in}(t) - \text{precoder\_out}(t-T)] \bmod M\} - \{[\text{precoder\_out}(t-2 \times T)] \bmod M\} \ldots - \{[\text{precoder\_out}(t-N \times T)] \bmod M\} \quad \text{Formula (7)}$$

In Formula (7), T is a symbol period of a signal, and M is a level quantity of a to-be-sent signal received by the modulation module when PAM-M modulation is performed on a modulated signal. Same as the definition of M in the foregoing content, precoder_out(t) may correspond to $b_k^N$ in Formula (6), precoder_in(t) may correspond to $a_k$ in Formula (6), precoder_out(t–T) may correspond to $b_{k-1}^N$ in Formula (6), precoder_out(t–2×T) may correspond to $(b_k^1 - b_{k-2}^N)$ in Formula (6), and precoder_out(t–N×T) may correspond to $(b_k^{N-1} - b_{k-N}^N)$ in Formula (6).

$b_k^N$ in Formula (6) may be alternatively described as a code block obtained after the modulated signal is processed by the encoding module at a $k^{th}$ moment, and $b_{k-N}^N$ is a result of delaying $b_k^N$ by N symbol periods. A symbol period may be a time interval between adjacent symbols. As shown in FIG. 7, one symbol period may be a time length that can be supported by one delay module. The delay module may include a device such as a delayer. The symbol period may be preset, may be randomly determined, or may be generated according to a specific rule. A symbol period on a sending apparatus side may be the same as or different from a symbol period on the receiving apparatus side. In an optional implementation, the symbol period on the sending apparatus side is the same as the symbol period on the receiving apparatus side.

In an optional implementation, N is determined based on M and a target level quantity of a receive end equalizer in the receiving apparatus. An optional implementation is provided, and N is determined by using Formula (8):

$$N = \frac{(L-1)}{(M-1)} - 1 \quad \text{Formula (8)}$$

In Formula (8), L is the target level quantity of the receive end equalizer in the receiving apparatus. L may be the target level quantity of the receive end equalizer, and L is determined based on a low-pass filtering impulse response introduced by a transmit end equalizer and the receive end equalizer and an impulse response of a link end-to-end system. If the receiving apparatus includes a judgement module, L may be a level quantity output by the judgement module (slicer).

L in Formula (8) may be determined based on the solutions provided in related content in FIG. 3 to FIG. 6 in the foregoing content. For example, the modulation module uses a PAM-M modulation scheme, and the modulation module is configured to perform M-level pulse amplitude modulation PAM-M modulation on the received to-be-sent signal. M is the level quantity of the to-be-sent signal received by the modulation module. Using an example in which M is 4, if the to-be-sent signal finally needs to be equalized as a 7-level polybinary PAM-4 signal, a value of L is 7 and a value of N is 1; if the to-be-sent signal finally needs to be equalized as a 13-level polybinary PAM-4 signal, a value of L is 13 and a value of N is 3; if the to-be-sent signal finally needs to be equalized as a 4-level PAM-4 signal, a value of L is 4 and a value of N is 1.

Figure 8:
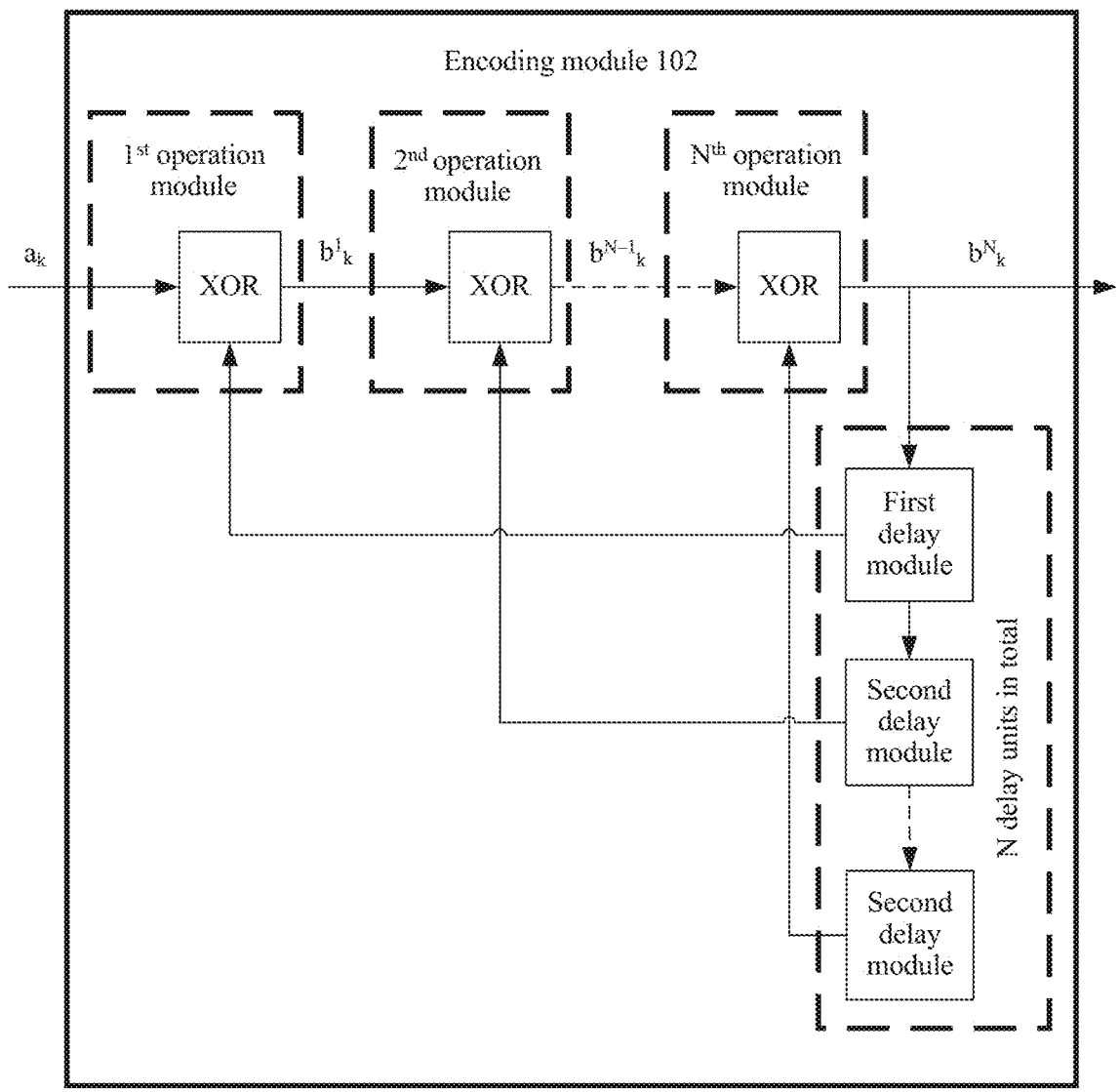
FIG. 8 is a schematic structural diagram of another encoding module according to an embodiment of this application.

In an optional implementation provided in this embodiment of this application, each of N operation modules includes an exclusive OR arithmetic logic unit, where an output of the $1^{st}$-round operation is obtained by performing an exclusive OR operation on the modulated signal and an output that is of the $N^{th}$-round operation and that is processed by a first delay module, and an output of the $i^{th}$-round operation is obtained by performing an exclusive OR operation on an output of the $(i-1)^{th}$-round operation and an output that is of the $N^{th}$-round operation and that is processed by a second delay module. FIG. 8 is an example of a schematic structural diagram of another encoding module according to an embodiment of this application. As shown in FIG. 8, an encoding module 102 includes N exclusive OR arithmetic logic units and N delay modules. One operation module may perform one round of operation, and one round of operation correspondingly uses one exclusive OR arithmetic logic unit and one delay module. As shown in FIG. 8, input precoder_in($a_k$) of the encoding module 102 is from a modulated signal output by the modulation module 101 in FIG. 2 and an encoded signal $b_k^N$ output by the encoding module 102. A relationship between a value $b_k^N$ of Precoder_out and a value $a_k$ of Pecoder_in may be represented by using Formula (9):

$$b_k^1 = (a_k) xor(b_{k-1}^N);$$
$$b_k^2 = (b_k^1) xor(b_{k-2}^N);$$
$$\ldots$$
$$b_k^i = (b_k^{i-1}) xor(b_{k-i}^N)$$
$$\ldots$$
$$b_k^N = (b_k^{N-1}) xor(b_{k-N}^N) \quad \text{Formula (9)}$$

In Formula (9), xor represents an exclusive OR operation. For remaining parameters, refer to the related descriptions of Formula (6) to Formula (8). Details are not described herein again. In this embodiment of this application, M is an integer greater than 1, and the value of M is selected in a plurality of manners. For example, M may be predefined, or may be determined based on an actual scenario. This embodiment of this application provides this optional implementation. If the solution provided in Formula (9) is applied, M may be set to 2.

Figure 9:
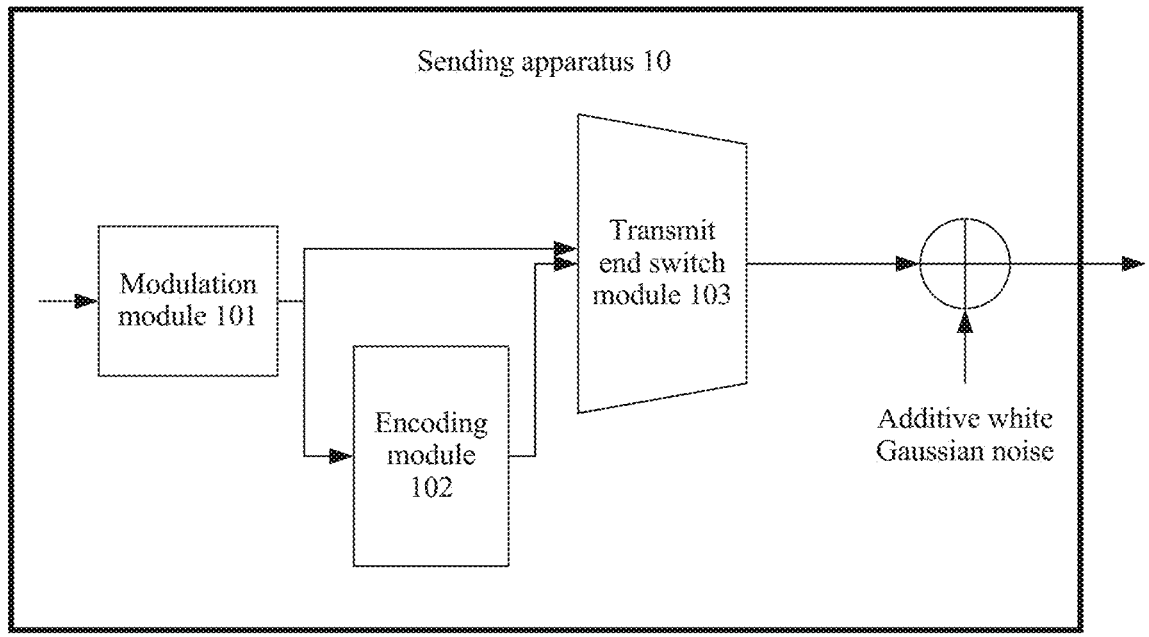
FIG. 9 is a schematic structural diagram of another sending apparatus according to an embodiment of this application.

Based on the foregoing content, it can be learned that if channel bandwidth is relatively narrow, a transmit end equalizer and a receive end equalizer produce a minimal low-pass filtering effect or even produce no low-pass filtering effect. In this case, an additive white Gaussian noise generated by a channel does not have an obvious filtering effect after passing through an equalizer, and a whitening characteristic of the noise is still obvious. In this case, performance of MLSD is relatively good, and a case in which consecutive bit errors are output is very rare or does not occur. On the contrary, if the channel bandwidth is relatively wide, the transmit end equalizer and/or the receive end equalizer need/needs to produce a relatively strong low-pass filtering effect. In this case, the additive white Gaussian noise generated by the channel is severely low-pass filtered after passing through the equalizer and becomes a non-whitening noise. Consequently, a problem of the consecutive bit errors is relatively serious. To better work in the two scenarios, FIG. 9 is an example of a schematic structural diagram of another sending apparatus according to an embodiment of this application. As shown in FIG. 9, a sending apparatus 10 may include a transmit end switch module 103.

Optionally, the transmit end switch module 103 is connected to a modulation module and an encoding module. The transmit end switch module is configured to: if a noise non-whitening degree in a to-be-restored signal received by a receiving apparatus is greater than a degree threshold, send, to the receiving apparatus, an encoded signal output by the encoding module; or if a noise non-whitening degree in a to-be-restored signal received by a receiving apparatus is not greater than a degree threshold, send, to the receiving apparatus, a modulated signal output by the modulation module. In this way, if the non-whitening degree is greater than the degree threshold, that is, the non-whitening degree is relatively large and a whitening degree is relatively small, a signal processed by the encoding module 102 is sent, to reduce a probability that consecutive bit errors occur in a communications system. If the non-whitening degree is not greater than the degree threshold, that is, the non-whitening degree is relatively small and a whitening degree is relatively large, a signal output by the modulation module 101 is directly sent. In other words, a signal that is not processed by the encoding module 102 is sent, to save system resources.

In an optional implementation, the transmit end switch module determines the noise non-whitening degree in the to-be-restored signal received by the receiving apparatus. For example, the transmit end switch module may determine the noise non-whitening degree based on channel bandwidth. For another example, the transmit end switch module obtains the to-be-restored signal and analyzes the to-be-restored signal. In another optional implementation, the transmit end switch module receives an instruction sent by a decision module, and chooses, according to the instruction, to transmit the modulated signal output by the modulation module 101 or output the signal output by the encoding module 102. The decision module may be disposed on a sending apparatus, may be disposed on the receiving apparatus side, or may be disposed at an upper management layer. The decision module may determine, in a plurality of manners, the noise non-whitening degree in the to-be-restored signal received by the receiving apparatus. For example, the decision module may determine the noise non-whitening degree based on channel bandwidth. For another example, the decision module obtains the to-be-restored signal and analyzes the to-be-restored signal.

Figure 10:
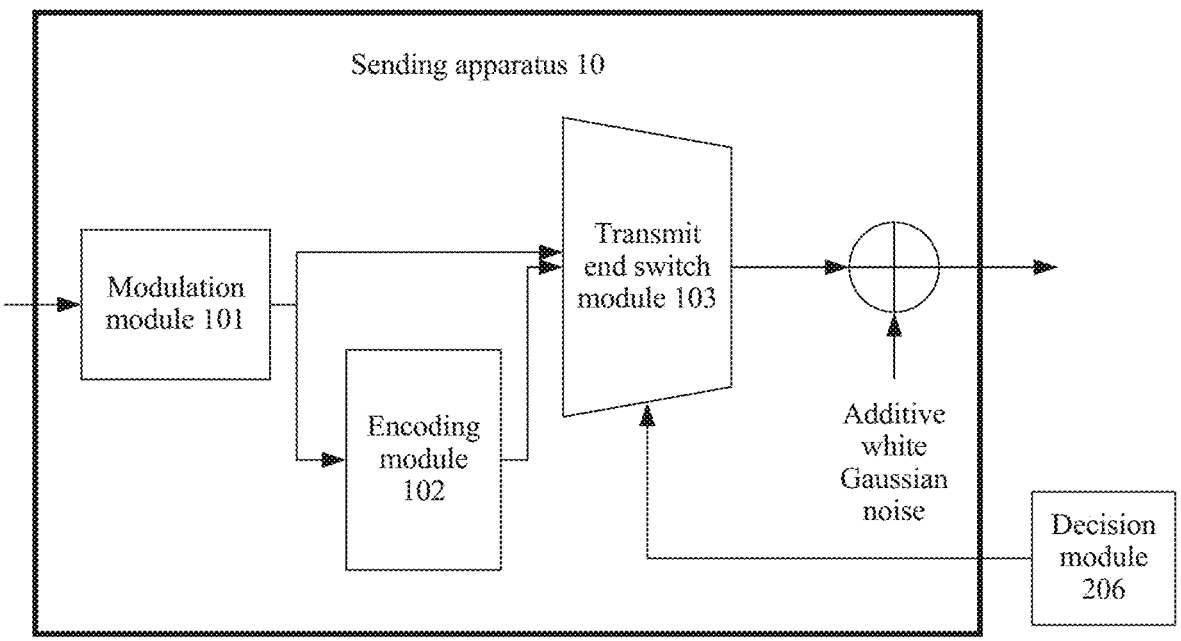
FIG. 10 is a schematic structural diagram of another sending apparatus according to an embodiment of this application.

FIG. 10 is an example of a schematic structural diagram of another sending apparatus according to an embodiment of this application. As shown in FIG. 10, a transmit end switch module 103 in the sending apparatus is connected to a decision module 206. Optionally, the transmit end switch module is further configured to receive indication information that is sent by the decision module and that is used to indicate a value relationship between a noise non-whitening degree in a to-be-restored signal received by a receiving apparatus and a degree threshold. In an optional implementation, the indication information may be an instruction for directly selecting a transmit loop. After receiving the indication information, the transmit end switch module 103 directly executes the instruction. The instruction may be some commands or may be an identifier. For example, 1 is used to identify, that the noise non-whitening degree in the to-be-restored signal received by the receiving apparatus is not greater than the degree threshold, and 0 is used to identify that the noise non-whitening degree in the to-be-restored signal received by the receiving apparatus is greater than the degree threshold. After determining the value relationship between the noise non-whitening degree in the to-be-restored signal and the degree threshold, the decision module directly sends 1 or 0 to the transmit end switch module. In a specific operation, the transmit end switch module may be an alternative switch.

To further improve system performance, the sending apparatus 10 in this embodiment of this application further includes a transmit end equalizer. In an optional implementation, the transmit end equalizer is directly connected to the encoding module 102 in FIG. 2. In an optional implementation, the modulation module 101 performs PAM-M modulation. As shown in FIG. 2, a to-be-sent signal received by the modulation module 101 in the sending apparatus 10 is first mapped through PAM-M, and then is processed by the encoding module 102. Optionally, to further lower a requirement on transmission bandwidth, a shaping filter may be used to perform equalization processing at a transmit end (that is, the transmit end equalizer may be the shaping filter), and then send the signal to a transport channel. Using a fiber transport channel as an example, the transport channel first converts a digital signal into an analog signal, and the analog signal is modulated to a laser for electro-optical conversion, and then is sent to a fiber link. In this way, the transmit end equalizer may perform equalization processing on a signal output by the encoding module, to improve system performance. Correspondingly, the receiving apparatus 20 first converts an optical signal into an electrical signal, and performs analog-to-digital conversion, and a white Gaussian noise is introduced to the transport channel. A receive end equalizer first performs equalization processing on a data stream sampled by the receiving apparatus, and an equalization target may be set to L-level. After MLSD processing is performed on an equalized signal, a processed signal is demapped through PAM into an original data stream.

Figure 11:
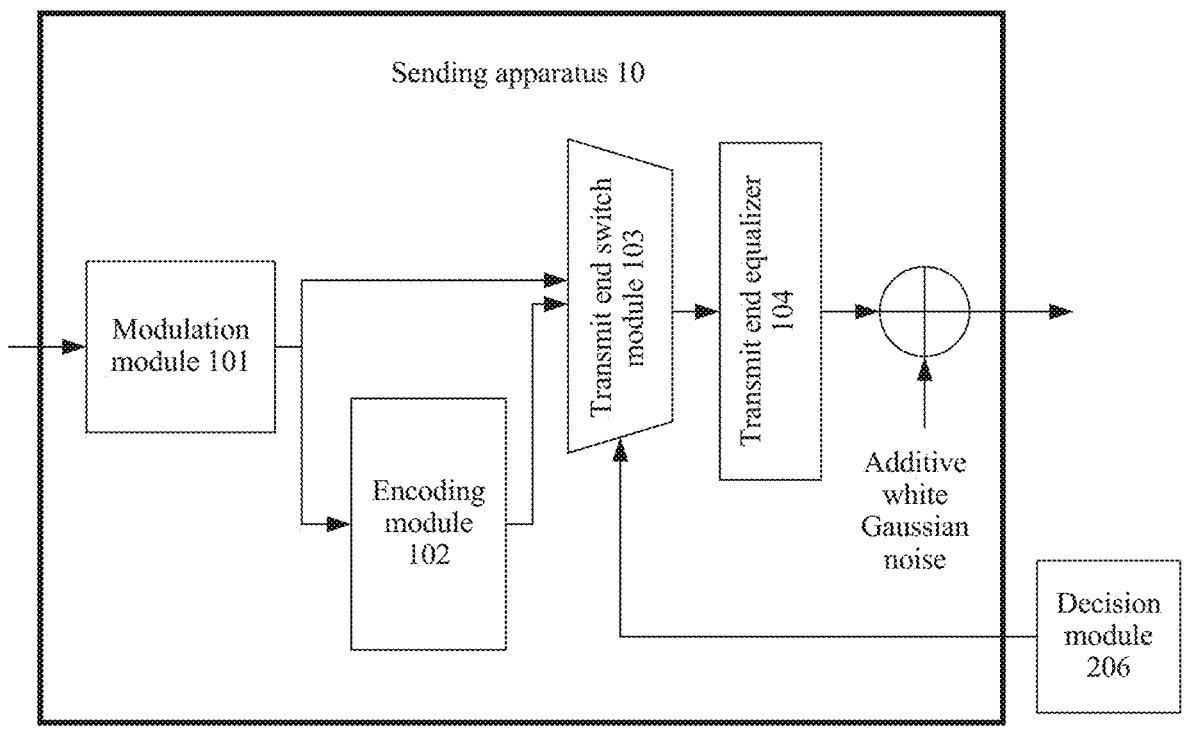
FIG. 11 is a schematic structural diagram of another sending apparatus according to an embodiment of this application.

The sending apparatus further includes the transmit end equalizer. The transmit end equalizer may be directly connected to the encoding module in FIG. 2, and receive the signal output by the encoding module, to further improve system performance. In another optional implementation, FIG. 11 is an example of a schematic structural diagram of another sending apparatus according to an embodiment of this application. As shown in FIG. 11, a transmit end equalizer is connected to a transmit end switch module. The transmit end equalizer is configured to equalize a signal output by the transmit end switch module, and send an equalized signal to a receiving apparatus. The signal output by the transmit end switch module is an encoded signal or a modulated signal. Optionally, equalization processing may be filtering processing and/or non-linear compensation, or may include other processing, for example, equalizing the signal output by the transmit end switch module, that is, performing filtering and/or non-linear compensation on the signal output by the transmit end switch module.

Figure 12:
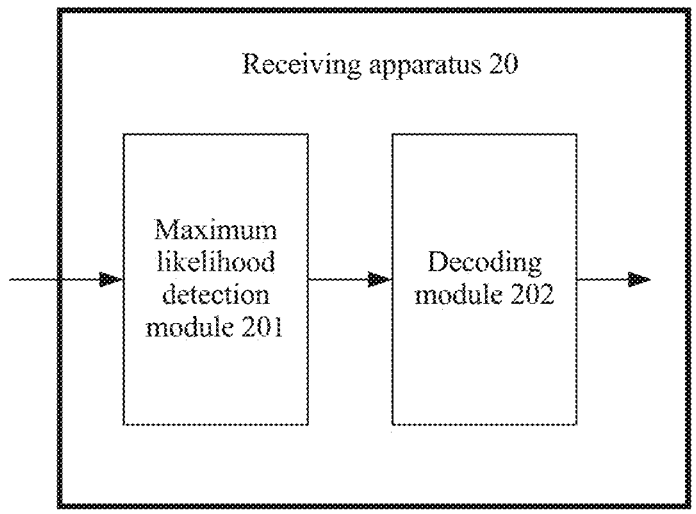
FIG. 12 is a schematic structural diagram of another communications apparatus according to an embodiment of this application.

Based on the foregoing embodiment and a same concept, FIG. 12 is a schematic structural diagram of another communications apparatus according to an embodiment of this application. As shown in FIG. 12, the communications apparatus may be a chip or a circuit, for example, a chip or a circuit that may be disposed on the receiving apparatus 20. The communications apparatus may correspond to the receiving apparatus in the foregoing content. The communications apparatus may include a maximum likelihood detection module 201 and a decoding module 202.

The maximum likelihood detection module 201 is configured to process a received to-be-restored signal to obtain an after-detection signal. The maximum likelihood detection module may be referred to as an MLSD module, and an operating principle of the MLSD module is described in the foregoing content. Details are not described herein again.

The decoding module 202 is configured to process the after-detection signal by using an operation module to obtain a decoded signal, where an input of the operation module is connected to an output of the maximum likelihood detection module and an output of the maximum likelihood detection module processed by a third delay module, and an output of the operation module is an output of the decoding module.

To be specific, the output that is of the maximum likelihood detection module and that is processed by the third delay module is an after-detection signal output by the detection module in the first several symbol periods. In an optional implementation, a latency between an output and an input of the third delay module is N symbol periods, and N is determined based on M and a target level quantity of a receive end equalizer in the receiving apparatus; and M-level pulse amplitude modulation PAM-M modulation is performed on the to-be-restored signal in a sending apparatus. For related content of N and M, refer to the description of the foregoing embodiment. This is not limited in this embodiment of this application.

It can be learned from the foregoing example that, in this embodiment of this application, the decoding module 202 performs a series of processing on the after-detection signal output by the maximum likelihood detection module, and generates the decoded signal based on the after-detection signal and the first several after-detection signals, so that an association between adjacent sequence can be reduced, and a probability that consecutive bit errors occur in a communications system can be reduced. This further provides a basis for subsequent cooperation with the sending apparatus to further reduce the probability that consecutive bit errors occur in the communications system, thereby improving overall system performance.

The operation module in the decoding module may include one operation or a combination of a plurality of operations, for example, any one or a combination of an addition operation, a modulo operation, and an exclusive OR operation. In an optional implementation, the operation module includes a second arithmetic logic unit and a modulo calculator that are sequentially connected. An input of the second arithmetic logic unit is an input of the operation module, and an output of the modulo calculator is an output of the operation module. That is, the receiving apparatus performs a second operation on the after-detection signal and the after-detection signal that is processed by the third delay module, and performs a modulo operation on a result of the second operation to obtain the decoded signal. The second operation may have a plurality of options. For example, the second operation is a one-level addition operation and/or a multi-level addition operation, or is an addition operation and a modulo operation.

In an optional implementation, a latency between an input and an output of the third delay module is P symbol periods. P may be selected in a plurality of manners. For example, P may be preset, may be determined according to a specific rule, may be randomly generated, or may be determined based on an actual application scenario. In an optional implementation, P is equal to N in the solution on the sending apparatus side described in FIG. 2 to FIG. 11. In this case, P is determined by using the following Formula (10):

$$P = \frac{(L-1)}{(M-1)} - 1 \quad \text{Formula (10)}$$

P in Formula (10) is the same as N in Formula (8). For other parameters in Formula (10), refer to the description of Formula (8). Details are not described herein again.

Figure 13:
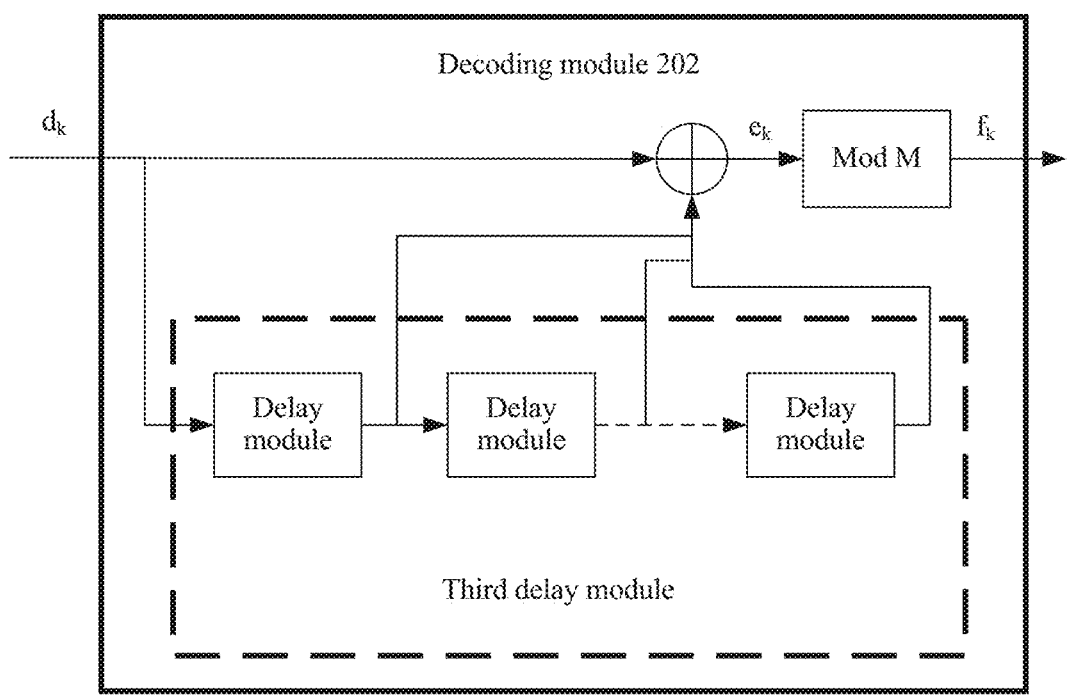
FIG. 13 is a schematic structural diagram of a decoding module according to an embodiment of this application.
Figure 13:
Figure 13:
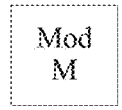

FIG. 13 is an example of a schematic structural diagram of a decoding module according to an embodiment of this application. The decoding module includes an adder, a modulo calculator, and a multi-level delay module. The multi-level delay module in FIG. 13 may be collectively referred to as a third delay module. As shown in FIG. 13, an input of the decoding module at a current moment is added to output that is of the adder and that is separately delayed a plurality of symbol periods, and then a result of the addition is sent to a modulo calculator. A modulo result may be used as an output of the decoding module at the current moment. A decoded signal output by the decoding module 202 may be determined according to Formula (11):

$$f_k = e_k \bmod M \quad \text{Formula (11)}$$

In Formula (11), $$e_k = d_k + \sum_{j=1}^{P} d_{k-j},$$

where $d_k$ is an after-detection signal, $d_{k-j}$ is an after-detection signal that is j symbol periods earlier than $d_k$, and $f_k$ is the decoded signal. For M, refer to the description of Formula (1) to Formula (10). A latency between an input and an output of the third delay module is P symbol periods. For P, refer to the description of Formula (10). Details are not described herein again.

$d_k$ in Formula (11) may also be described as a signal processed by a maximum likelihood detection module at the $k^{th}$ moment, and $f_k$ may also be described as a code block obtained after the signal processed by the maximum likelihood detection module at the $k^{th}$ moment is decoded.

The decoded signal output by the decoding module 202 may be alternatively determined according to Formula (12):

$$\text{decoder\_out}(t) = |\text{decoder\_in}(t) + \text{decoder\_in}(t-T) \ldots + \text{decoder\_in}(t-P \times T)| \bmod M \quad \text{Formula (12)}$$

In Formula (12), T is a symbol period of a signal, and M is a level quantity of a to-be-sent signal received by a modulation module when PAM-M modulation is performed on a modulated signal in a sending apparatus. Same as the definition of M in the foregoing content, decoder_out(t) may be $f_k$ in Formula (11), decoder_in(t) may be $d_k$ in Formula (11), decoder_in(t-T) may be $d_{k-1}$ in Formula (11), and decoder_in(t-P×T) may be $d_{k-P}$ in Formula (11).

This embodiment of this application provides another optional implementation. An operation module includes P exclusive OR arithmetic logic units that are sequentially connected, where an input of the first exclusive OR arithmetic logic unit in the P exclusive OR arithmetic logic units is connected to an output of the maximum likelihood detection module and an output of the maximum likelihood detection module processed by a fourth delay module, and an input of the $j^{th}$ exclusive OR arithmetic logic unit in the P exclusive OR arithmetic logic units is connected to an output of the $(j-1)^{th}$ exclusive OR arithmetic logic unit and an output of the maximum likelihood detection module processed by a fifth delay module, where j is an integer greater than 1 and less than or equal to P. and P is a positive integer. In other words, a receiving apparatus performs P rounds of exclusive OR operations on the after-detection signal and an after-detection signal that is processed by the third delay module, and uses a signal output in the $P^{th}$-round exclusive OR operation as the decoded signal, where an output of the $1^{st}$-round exclusive OR operation in the P rounds of exclusive OR operations is determined based on the after-detection signal and an after-detection signal that is processed by the fourth delay module, and an output of the $j^{th}$-round exclusive OR operation in the P rounds of exclusive OR operations is determined based on an output of the $(j-1)^{th}$-round exclusive OR operation and an after-detection signal that is processed by the fifth delay module. The third delay module may include the fourth delay module and the fifth delay module.

In an optional implementation, a latency between an output and an input of the fourth delay module is one symbol period. To be specific, a signal output by the fourth delay module is a signal that is one symbol period earlier than an input signal of the fourth delay module. In an optional implementation, a latency between an output and an input of the fifth delay module is j symbol periods. To be specific, a signal output by the fifth delay module is a signal that is j symbol periods earlier than an input signal of the fifth delay module, so that a probability that consecutive bit errors occur in a communications system can be reduced.

Figure 14:
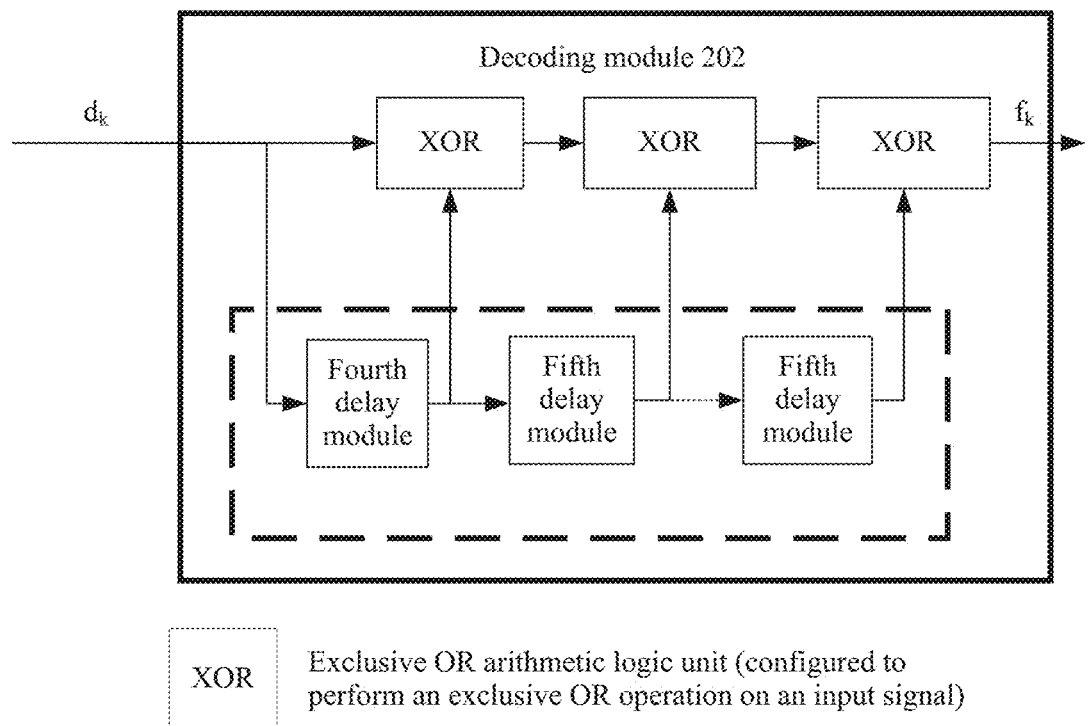
FIG. 14 is a schematic structural diagram of another decoding module according to an embodiment of this application.

FIG. 14 is an example of a schematic structural diagram of another decoding module according to an embodiment of this application. As shown in FIG. 14, a decoding module 202 includes a plurality of exclusive OR arithmetic logic units and a plurality of delay modules. As shown in FIG. 14, optionally, the decoding module 202 may include P exclusive OR arithmetic logic units and P delay modules. One of the P delay modules that is connected to the first exclusive OR arithmetic logic unit is referred to as a fourth delay module, and remaining delay modules may be referred to as fifth delay modules.

As shown in FIG. 14, input MLSD_out (also referred to as decoder_in(t)) ($d_k$) of the decoding module 202 is from an after-detection signal output by the maximum likelihood detection module 201 in FIG. 12. The decoding module 202 outputs a decoded signal $f_k$. A relationship between a value $f_k$ of decoder_out(t) and a value $d_k$ of decoder_in(t) may be represented by using Formula (13):

$$f_k = (d_k) \text{xor}(d_{k-1}) \text{xor}(d_{k-2}) \ldots \text{xor}(d_{k-N}) \quad \text{Formula (13)}$$

In Formula (13), xor represents an exclusive OR operation. For remaining parameters, refer to the related description of Formula (11). Details are not described herein again. In this embodiment of this application, for a value of M, refer to the foregoing description. This embodiment of this application provides this optional implementation. If the solution provided in Formula (13) is applied, M may be set to 2.

Figure 15:
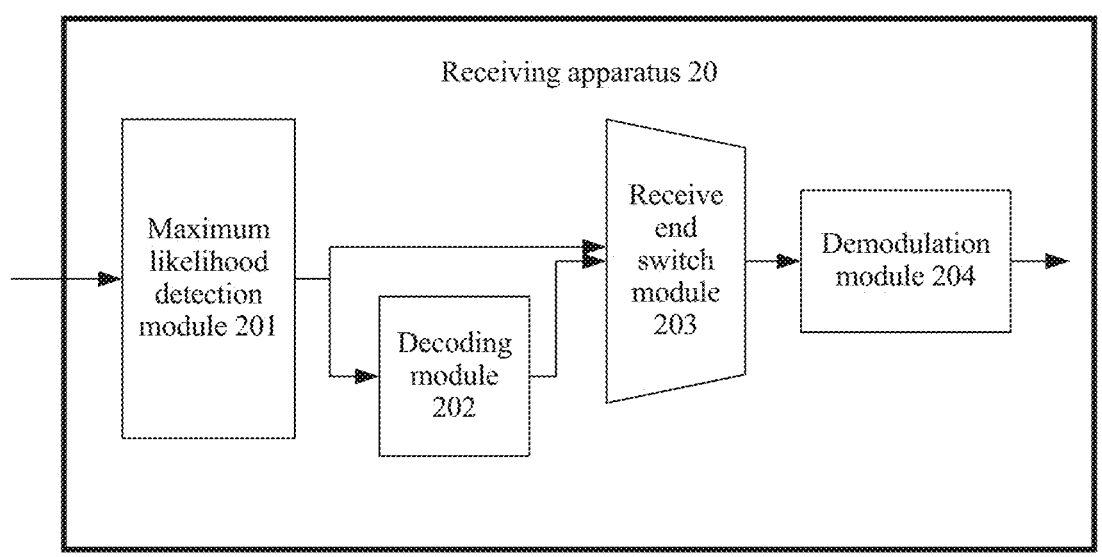
FIG. 15 is a schematic structural diagram of another receiving apparatus according to an embodiment of this application.

Based on the foregoing content, it can be learned that if channel bandwidth is relatively narrow, a transmit end equalizer and a receive end equalizer produce a minimal low-pass filtering effect or even produce no low-pass filtering effect. In this case, an additive white Gaussian noise generated by a channel does not have an obvious filtering effect after passing through an equalizer, and a whitening characteristic of the noise is still obvious. In this case, performance of MLSD is relatively good, and a case in which consecutive bit errors are output is very rare or does not occur. On the contrary, if the channel bandwidth is relatively wide, the transmit end equalizer and/or the receive end equalizer need/needs to produce a relatively strong low-pass filtering effect. In this case, the additive white Gaussian noise generated by the channel is severely low-pass filtered after passing through the equalizer and becomes a non-whitening noise. Consequently, a problem of the consecutive bit errors is relatively serious. To better work in the two scenarios, FIG. 15 is an example of a schematic structural diagram of another receiving apparatus according to an embodiment of this application. As shown in FIG. 15, a receiving apparatus 20 may include a receive end switch module 203. Optionally, the receiving apparatus further includes a demodulation module 204 connected to the receive end switch module 203.

As shown in FIG. 15, one end of the receive end switch module is connected to a maximum likelihood detection module and a decoding module, and the other end is connected to the demodulation module. Optionally, the receive end switch module is configured to: if a noise non-whitening degree in a to-be-restored signal received by the receiving apparatus is greater than a degree threshold, send, to the demodulation module, a decoded signal output by the decoding module; or if a noise non-whitening degree in a to-be-restored signal received by the receiving apparatus is not greater than a degree threshold, send, to the demodulation module, an after-detection signal output by the maximum likelihood detection module. Optionally, the demodulation module is configured to: after receiving the decoded signal, demodulate the received decoded signal to obtain a restored signal; or after receiving the after-detection signal, demodulate the received after-detection signal to obtain a restored signal. In this way, if the non-whitening degree is greater than the degree threshold, that is, the non-whitening degree is relatively large, a signal processed by the decoding module 202 is output to the demodulation module 204, to reduce a probability that consecutive bit errors occur in a communications system. If the non-whitening degree is not greater than the degree threshold, that is, the non-whitening degree is relatively small, a signal output by the maximum likelihood detection module 201 is directly sent to the demodulation module 204. To be specific, a signal that is not processed by the decoding module 202 is sent, to save system resources.

In an optional implementation, the receive end switch module determines the noise non-whitening degree in the to-be-restored signal received by the receiving apparatus. For example, the receive end switch module may determine the noise non-whitening degree based on channel bandwidth. For another example, the receive end switch module obtains the to-be-restored signal and analyzes the to-be-restored signal. In another optional implementation, the receive end switch module receives an instruction sent by a decision module and chooses, according to the instruction, whether to output the signal processed by the decoding module 202 to the demodulation module 204, or directly sends, to the demodulation module 204, the signal output by the maximum likelihood detection module 201. The decision module may be disposed on a sending apparatus, may be disposed on the receiving apparatus side, or may be disposed at an upper management layer. The decision module may determine, in a plurality of manners, the noise non-whitening degree in the to-be-restored signal received by the receiving apparatus. For example, the decision module may determine the noise non-whitening degree based on channel bandwidth. For another example, the decision module obtains the to-be-restored signal and analyzes the to-be-restored signal.

Figure 16:
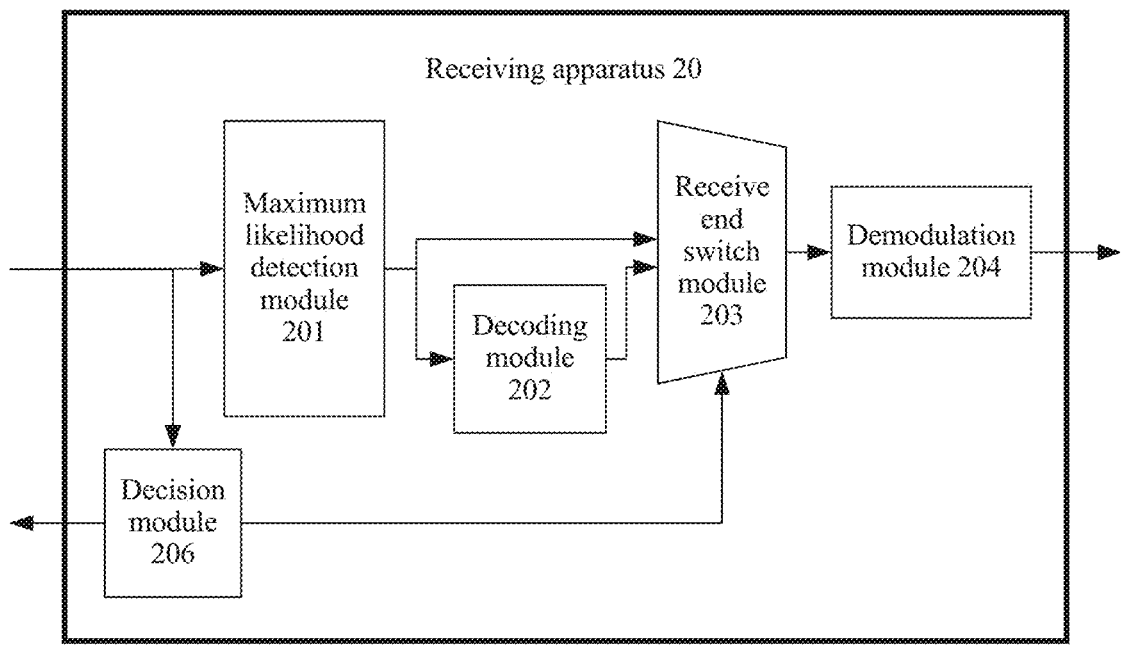
FIG. 16 is a schematic structural diagram of another receiving apparatus according to an embodiment of this application.

FIG. 16 is an example of a schematic structural diagram of another receiving apparatus according to an embodiment of this application. As shown in FIG. 16, a receive end switch module 203 in the receiving apparatus is connected to a decision module 206. Optionally, the receive end switch module is further configured to receive indication information that is sent by the decision module and that is used to indicate a value relationship between a noise non-whitening degree in a to-be-restored signal received by the receiving apparatus and a degree threshold. In an optional implementation, the indication information may be an instruction for directly selecting a transmit loop. After receiving the indication information, the receive end switch module 203 directly executes the instruction. The instruction may be some commands or may be an identifier. For example, 1 is used to identify that the noise non-whitening degree in the to-be-restored signal received by the receiving apparatus is not greater than the degree threshold, and 0 is used to identify that the noise non-whitening degree in the to-be-restored signal received by the receiving apparatus is greater than the degree threshold. After determining the value relationship between the noise non-whitening degree in the to-be-restored signal and the degree threshold, the decision module directly sends 1 or 0 to a transmit end switch module. In a specific operation, the receive end switch module may be an alternative switch.

In an optional implementation, the decision module is configured to send, to the receive end switch module based on the to-be-restored signal, the indication information that is used to indicate the value relationship between the noise non-whitening degree in the to-be-restored signal received by the receiving apparatus and the degree threshold. The receive end switch module is further configured to receive the indication information.

Figure 17:
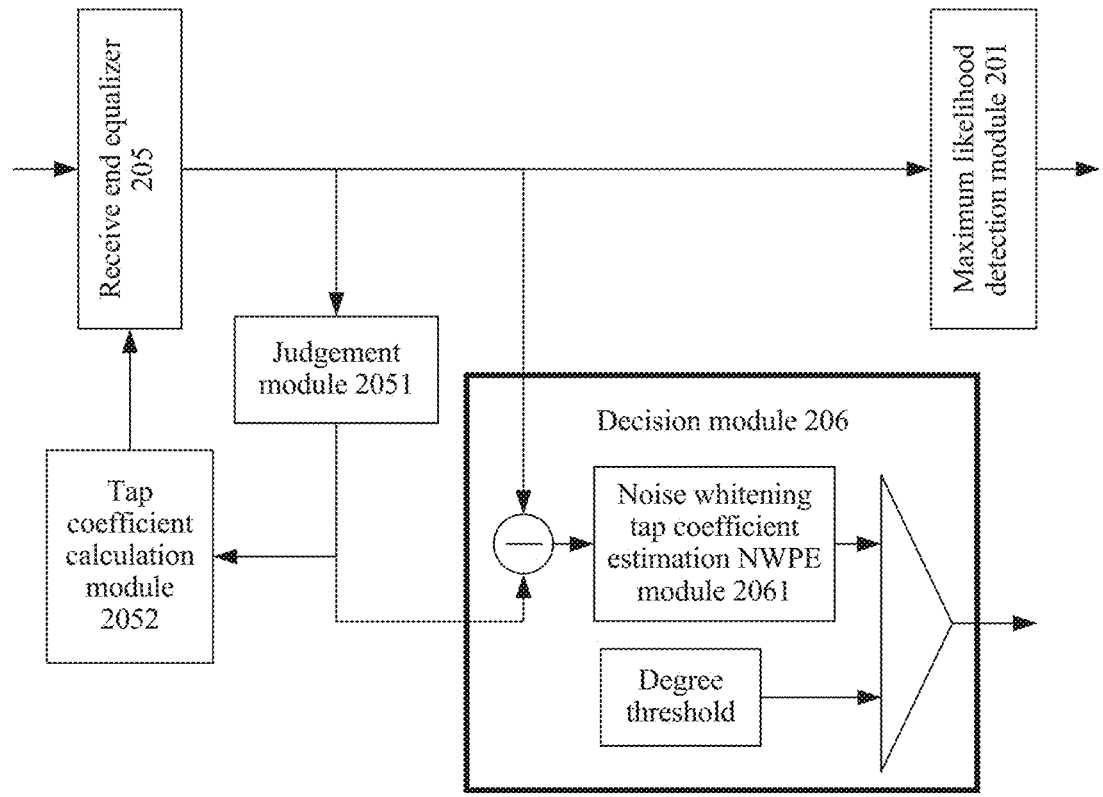
FIG. 17 is a schematic structural diagram of another receiving apparatus according to an embodiment of this application.

FIG. 17 is an example of a schematic structural diagram of another receiving apparatus according to an embodiment of this application. As shown in FIG. 17, the receiving apparatus further includes a judgement module 2051 connected to a decision module, and the judgement module 2051 is configured to perform judgement processing on a to-be-restored signal to obtain an after-judgement signal. Optionally, the decision module is specifically configured to: estimate a noise whitening tap coefficient in the to-be-restored signal based on the after-judgement signal and the to-be-restored signal; determine a value relationship between a noise non-whitening degree in the to-be-restored signal and a degree threshold based on a value relationship between the noise whitening tap coefficient and a judgement threshold, and send, to a receive end switch module, indication information that is used to indicate the value relationship between the noise non-whitening degree in the to-be-restored signal received by the receiving apparatus and the degree threshold. As shown in FIG. 17, optionally, the receiving apparatus may further include a tap coefficient calculation module 2052.

Optionally, when initialization of a communications system starts, an encoding module and a decoding module in this embodiment of this application are first bypassed. After the system works normally, the decision module 206 obtains the received to-be-restored signal, and the decision module further receives the after-judgement signal output by the judgement module 2051. In a possible case, the to-be-restored signal received by the decision module 206 includes a signal and a noise, but the after-judgement signal output by the judgement module 2051 includes only a signal. The decision module 206 subtracts the after-judgement signal from the to-be-restored signal by using a subtractor to obtain the noise in the to-be-restored signal, then estimates the noise whitening tap coefficient in the to-be-restored signal based on the noise in the to-be-restored signal, and further compares the noise whitening tap coefficient with the judgement threshold to determine the value relationship between the noise non-whitening degree in the to-be sent signal and the degree threshold.

Optionally, if the noise whitening tap coefficient is greater than the judgement threshold, it is determined that the noise non-whitening degree is greater than the degree threshold; or if the noise whitening tap coefficient is not greater than the judgement threshold, it is determined that the noise non-whitening degree is not greater than the degree threshold. The judgement threshold may be the same as or different from the degree threshold. The judgement threshold and the degree threshold may be preset, or may be generated according to a specific rule. In this way, whether the noise non-whitening degree is not greater than the degree threshold can be accurately determined. The noise non-whitening degree may be described by using the noise whitening tap coefficient.

If the noise whitening tap coefficient output by a noise whitening tap coefficient estimation (Noise whitening parameter estimation, NWPE) module 2061 is greater than the judgement threshold, it indicates that the noise non-whitening degree is relatively large and a whitening degree is relatively small, and therefore the encoding module and the decoding module are started. If the noise whitening tap coefficient is not greater than the judgement threshold, it indicates that the noise non-whitening degree is relatively small and a whitening degree is relatively large, and therefore the encoding module and/or the decoding module are/is not started. In this case, a transmit end switch module directly outputs a signal output by a modulation module, and/or the receive end switch module directly outputs a signal output by a maximum likelihood detection module. The noise whitening tap coefficient estimation module is configured to quantize a noise whitening tap coefficient in a system.

The NWPE module 2061 may include an autoregressive (AR) module. The AR module is configured to estimate the noise whitening tap coefficient. For example, for simplicity, the corresponding AR module may be set to be 2-tap. After maximum value normalization is performed on the tap coefficient, a value $|q|$ obtained by performing a modulo operation on q in a tap coefficient [1 q] or [q 1] is compared with the judgement threshold. When $|q|$ is greater than the judgement threshold, it indicates that the noise non-whitening degree is relatively large and the corresponding whitening degree is relatively small, and therefore the encoding module and the decoding module are started. When $|q|$ is not greater than the judgement threshold, it indicates that the noise non-whitening degree is relatively small and the corresponding whitening degree is relatively large, and therefore the encoding module and/or the decoding module are/is not started. The judgement threshold may be set to an empirical value that is verified by the system, for example, may be set to 0.5. If the NWPE module is set to be multi-tap, the judgement threshold may be set to a vector for comparison according to a calculation rule, or a plurality of tap coefficients of the NWPE module are weighted for comparison with the judgement threshold.

Figure 18:
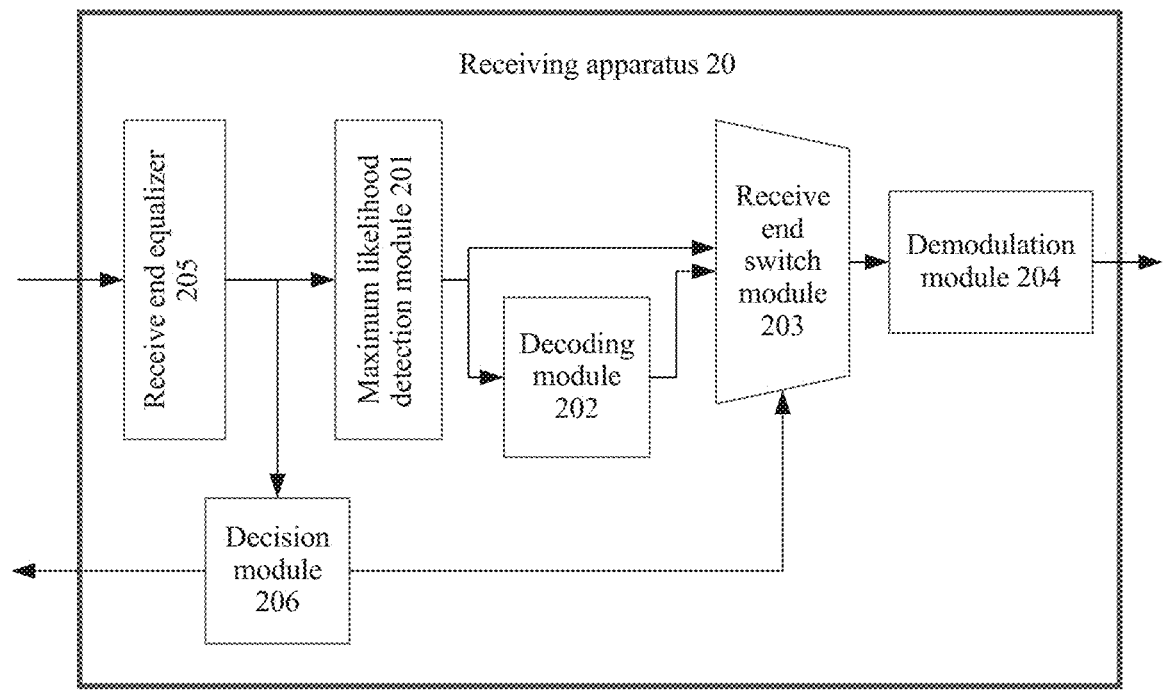
FIG. 18 is a schematic structural diagram of another receiving apparatus according to an embodiment of this application.

FIG. 18 is an example of a schematic structural diagram of another receiving apparatus according to an embodiment of this application. As shown in FIG. 18, the receiving apparatus further includes a receive end equalizer that is separately connected to a maximum likelihood detection module, a decision module, and a judgement module, and the receive end equalizer is configured to equalize a received signal to obtain a to-be-restored signal and output the to-be-restored signal to the maximum likelihood detection module, the decision module, and the judgement module. In this way, system performance can be improved. Optionally, equalization processing may be filtering processing and/or non-linear compensation, or may include other processing, for example, equalizing a signal output by a transmit end switch module, that is, performing filtering and/or non-linear compensation on the signal output by the transmit end switch module. In this embodiment of this application, based on FIG. 12, the receive end equalizer may be directly added before the maximum likelihood detection module 201, that is, the receive end equalizer, the maximum likelihood detection module, and a decoding module are sequentially connected. Optionally, the receive end equalizer may be an FFE.

Optionally, as shown in FIG. 17, the judgement module 2051 may be connected to the receive end equalizer 205 by using a tap coefficient calculation module 2052, that is, an after-judgement signal output by the judgement module 2051 is fed back to the receive end equalizer 205 again, to assist the receive end equalizer 205 in performing equalization processing, thereby further improving the system performance.

Figure 19:
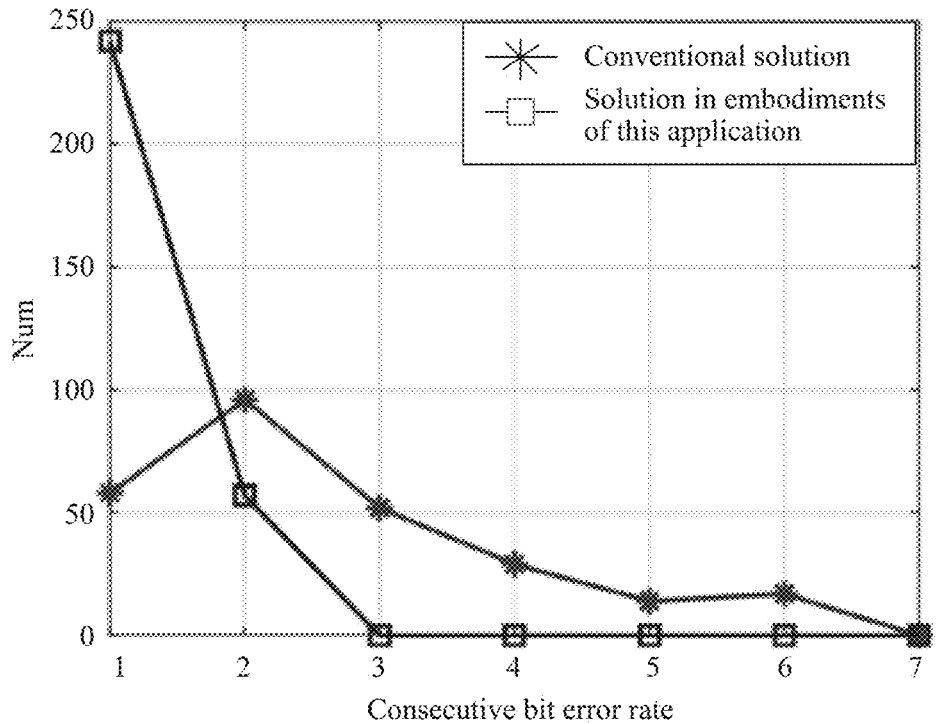
FIG. 19 is a schematic diagram of a simulation effect of a solution according to an embodiment of this application.

Simulation of 7-level polybinary PAM4 is performed according to the solution provided in this embodiment of this application. FIG. 19 is an example of a schematic diagram of a simulation effect of a solution according to an embodiment of this application. As shown in FIG. 19, a total quantity of symbols used for simulation is 60,000, and the simulation result is shown in FIG. 19. It can be learned that there are two consecutive bit errors, three consecutive bit errors, or even more consecutive bit errors in a conventional solution. A total quantity of bit errors in a system is 694. After this embodiment of this application is used, in comparison with the conventional solution, a quantity of consecutive bit errors is greatly reduced, consecutive bit errors basically do not occur, and most of bit errors are discrete bit errors that occur independently. After the present invention is used, the total quantity of bit errors is greatly reduced from 694 in the conventional solution to 356. It can be learned that in this embodiment of this application, a scenario in which consecutive bit errors exist in an output of MLSD if a noise characteristic does not meet a white Gaussian noise, the consecutive bit errors can be greatly eliminated, thereby improving the system performance.

It should be noted that, unit or module division in the embodiments of this application is an example, and is merely logical function division. In actual implementation, another division manner may be used. Functional units in the embodiments of this application may be integrated into one processing unit, or each of the units may exist alone physically, or two or more units are integrated into one unit. The foregoing integrated unit may be implemented in a form of hardware, or may be implemented in a form of a software functional unit.

Figure 20:
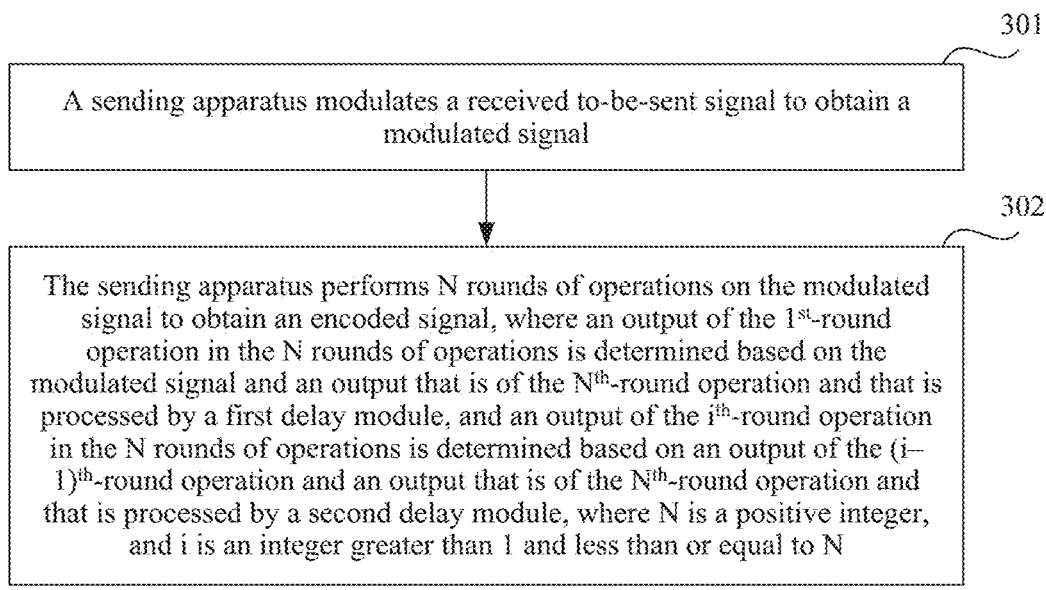
FIG. 20 is a schematic flowchart of a communication method according to an embodiment of this application.

Based on the foregoing embodiment and a same concept, an embodiment of this application further provides a communication method. The communication method may be implemented by the sending apparatus 10 in the foregoing embodiment. FIG. 20 is an example of a schematic flowchart of a communication method according to an embodiment of this application. As shown in FIG. 20, the method includes the following steps.

Step 301: A sending apparatus modulates a received to-be-sent signal to obtain a modulated signal. The modulation may be electrical modulation. This embodiment of this application is applicable to a plurality of scenarios. For example, the to-be-sent signal may be modulated by using a modulation scheme such as PAM-M modulation or QAM-E. The QAM-E modulation includes two channels of modulation, and each channel of modulation may also be referred to as the PAM-M modulation, where M and E may be integers greater than 1.

The to-be-sent signal described in this embodiment of this application may be a binary bit sequence. The binary bit sequence may be binary bit quantized information such as a text, audio, or a video. In an optional implementation, a bit sequence with a specific length that is received by a modulation module may be referred to as a to-be-sent signal. The specific length may be preset, or may be determined based on an actual situation. For example, in 4-level modulation, a binary 2-bit signal may correspond to a 4-level to-be-sent signal.

Step 302: The sending apparatus performs N rounds of operations on the modulated signal to obtain an encoded signal, where an output of the $1^{st}$-round operation in the N rounds of operations is determined based on the modulated signal and an output that is of the $N^{th}$-round operation and that is processed by a first delay module, and an output of the $i^{th}$-round operation in the N rounds of operations is determined based on an output of the $(i-1)^{th}$-round operation and an output that is of the $N^{th}$-round operation and that is processed by a second delay module, where N is a positive integer, and i is an integer greater than 1 and less than or equal to N. Performing the N rounds of operations in step 302 may also be referred to as performing encoding on the modulated signal, and the encoding may be electrical encoding. Optionally, encoding in step 301 may be performed to increase a single-symbol information amount, and encoding in step 302 may be performed to increase system robustness. Encoding functions in the two steps may be different, and specific operation modes may also be different. It can be learned from the foregoing example that this embodiment of this application provides a basis for subsequent cooperation with a receiving apparatus to reduce a probability that consecutive bit errors occur in a communications system, thereby improving overall system performance.

In an optional implementation, a latency between an output and an input of the first delay module is one symbol period. To be specific, a signal output by the first delay module is a signal that is one symbol period earlier than an input signal of the first delay module. That is, an input of the $1^{st}$ operation module in N operation modules includes two parts: the modulated signal and an encoded signal that is output by an encoding module before one symbol period. The encoded signal that is output by the encoding module before one symbol period may be an encoded signal corresponding to a signal that is one symbol period earlier than the to-be-sent signal.

In another optional implementation, a latency between an output and an input of the second delay module is i symbol periods. To be specific, a signal output by the second delay module is a signal that is i symbol periods earlier than an input signal of the second delay module. That is, an input of the $i^{th}$ operation module in N operation modules includes two parts: an output of a previous operation module of the $i^{th}$ operation module and an encoded signal that is output by an encoding module before i symbol periods. The encoded signal that is output by the encoding module before i symbol periods may be an encoded signal corresponding to a signal that is i symbol periods earlier than the to-be-sent signal.

To improve system flexibility, in an optional implementation, the output of the $1^{st}$-round operation is obtained by performing a first operation on the modulated signal and the output that is of the $N^{th}$-round operation and that is processed by the first delay module and performing a modulo operation on a result of the first operation, and the output of the $i^{th}$-round operation is obtained by performing a first operation on the output of the $(i-1)^{th}$-round operation and the output that is of the $N^{th}$-round operation and that is processed by the second delay module and performing a modulo operation on a result of the first operation. In another optional implementation, the output of the $1^{st}$-round operation is obtained by performing an exclusive OR operation on the modulated signal and the output that is of the $N^{th}$-round operation and that is processed by the first delay module, and the output of the $i^{th}$-round operation is obtained by performing an exclusive OR operation on the output of the $(i-1)^{th}$-round operation and the output that is of the $N^{th}$-round operation and that is processed by the second delay module.

To further improve the system performance, in an optional implementation, that the sending apparatus modulates the received to-be-sent signal includes: the sending apparatus performs M-level pulse amplitude modulation PAM-M modulation on the received to-be-sent signal, where the modulo operation includes performing a modulo operation on M by using the result of the first operation.

In an optional implementation. N is determined based on M and a target level quantity of a receive end equalizer in a receiving apparatus, so that the probability that consecutive bit errors occur in the communications system can be further reduced.

In an optional implementation, after the sending apparatus obtains the encoded signal, the method further includes: if determining that a noise non-whitening degree in a to-be-restored signal received by the receiving apparatus is greater than a degree threshold, sending, by the sending apparatus, the encoded signal to the receiving apparatus; or if determining that a noise non-whitening degree in a to-be-restored signal received by the receiving apparatus is not greater than a degree threshold, sending, by the sending apparatus, the modulated signal to the receiving apparatus, so that the probability that consecutive bit errors occur in the communications system can be further reduced.

In an optional implementation, that the sending apparatus determines whether the noise non-whitening degree in the to-be-restored signal received by the receiving apparatus is greater than the degree threshold includes: receiving indication information that is used to indicate a value relationship between the noise non-whitening degree in the to-be-restored signal received by the receiving apparatus and the degree threshold; and determining, according to the indication information whether the noise non-whitening degree in the to-be-restored signal received by the receiving apparatus is greater than the degree threshold, so that the probability that consecutive bit errors occur in the communications system can be further reduced.

For concepts that are in this method embodiment and that are related to the technical solutions provided in the embodiments of this application, such as explanations and detailed descriptions of parameters and other steps, refer to the descriptions of the content in the foregoing apparatus or other embodiments. Details are not described herein again.

Figure 21:
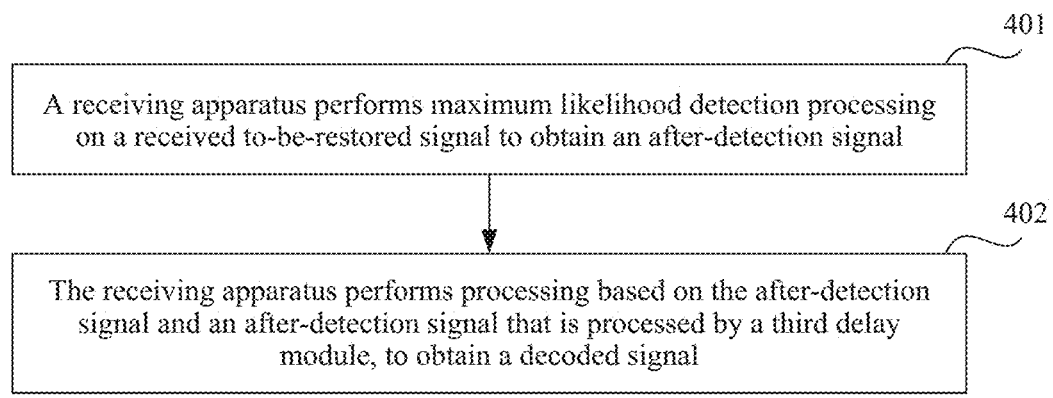
FIG. 21 is a schematic flowchart of another communication method according to an embodiment of this application.

Based on the foregoing embodiment and a same concept, an embodiment of this application further provides a communication method. The communication method may be implemented by the receiving apparatus 20 in the foregoing embodiment. FIG. 21 is an example of a schematic flowchart of a communication method according to an embodiment of this application. As shown in FIG. 21, the method includes the following steps.

Step 401: A receiving apparatus performs maximum likelihood detection processing on a received to-be-restored signal to obtain an after-detection signal.

Step 402: The receiving apparatus performs processing based on the after-detection signal and an after-detection signal that is processed by a third delay module, to obtain a decoded signal.

In an optional implementation, a latency between an output and an input of the third delay module is N symbol periods, and N is determined based on M and a target level quantity of a receive end equalizer in the receiving apparatus; and M-level pulse amplitude modulation PAM-M modulation is performed on the to-be-restored signal in a sending apparatus. For related content of N and M, refer to the description of the foregoing embodiment. This is not limited in this embodiment of this application. That is, an output that is of a maximum likelihood detection module and that is processed by the third delay module is an after-detection signal output by the detection module in the first several symbol periods.

In an optional implementation, that the receiving apparatus performs processing based on the after-detection signal and the after-detection signal that is processed by the third delay module, to obtain the decoded signal includes: the receiving apparatus performs a second operation on the after-detection signal and the after-detection signal that is processed by the third delay module, and performs a modulo operation on a result of the second operation to obtain the decoded signal. In another optional implementation, the receiving apparatus performs P rounds of exclusive OR operations on the after-detection signal and the after-detection signal that is processed by the third delay module, and uses a signal output in the $P^{th}$-round exclusive OR operation as the decoded signal, where an output of the $1^{st}$-round exclusive OR operation in the P rounds of exclusive OR operations is determined based on the after-detection signal and an after-detection signal that is processed by a fourth delay module, and an output of the $j^{th}$-round exclusive OR operation in the P rounds of exclusive OR operations is determined based on an output of the $(j-1)^{th}$-round exclusive OR operation and an after-detection signal that is processed by a fifth delay module, where j is an integer greater than 1 and less than or equal to P, and P is a positive integer.

In an optional implementation, a latency between an output and an input of the fourth delay module is one symbol period. To be specific, a signal output by the fourth delay module is a signal that is one symbol period earlier than an input signal of the fourth delay module. In an optional implementation, a latency between an output and an input of the fifth delay module is j symbol periods. To be specific, a signal output by the fifth delay module is a signal that is j symbol periods earlier than an input signal of the fifth delay module, so that a probability that consecutive bit errors occur in a communications system can be reduced.

In an optional implementation, the modulo operation includes performing a modulo operation on M by using the result of the second operation, so that the probability that consecutive bit errors occur in the communications system can be further reduced.

To better improve system performance, in an optional implementation, after the receiving apparatus determines the decoded signal, the method further includes: if a noise non-whitening degree in the to-be-restored signal received by the receiving apparatus is greater than a degree threshold, demodulating the decoded signal to obtain a restored signal; or if a noise non-whitening degree in the to-be-restored signal received by the receiving apparatus is not greater than a degree threshold, demodulating the after-detection signal to obtain a restored signal.

In an optional implementation, that the receiving apparatus determines whether the noise non-whitening degree in the to-be-restored signal received by the receiving apparatus is not greater than the degree threshold includes: the receiving apparatus performs judgement processing on the to-be-restored signal to obtain an after-judgement signal, and the receiving apparatus estimates a noise whitening tap coefficient in the to-be-restored signal based on the after-judgement signal and the to-be-restored signal, and determines a value relationship between the noise non-whitening degree in the to-be-restored signal and the degree threshold based on a value relationship between the noise whitening tap coefficient and a judgement threshold.

To further improve the system performance, in an optional implementation, after the receiving apparatus determines the value relationship between the noise non-whitening degree in the to-be-restored signal and the degree threshold, the method further includes: sending, by the receiving apparatus to the sending apparatus, indication information that is used to indicate the value relationship between the noise non-whitening degree in the to-be-restored signal received by the receiving apparatus and the degree threshold. For related description of equalization, refer to the foregoing content.

For concepts that are in this method embodiment and that are related to the technical solutions provided in the embodiments of this application, such as explanations and detailed descriptions of parameters and other steps, refer to the descriptions of the content in the foregoing apparatus or other embodiments. Details are not described herein again.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of the present invention.

A person of ordinary skill in the art may be aware that, illustrative logical blocks and steps described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

Figure 22:
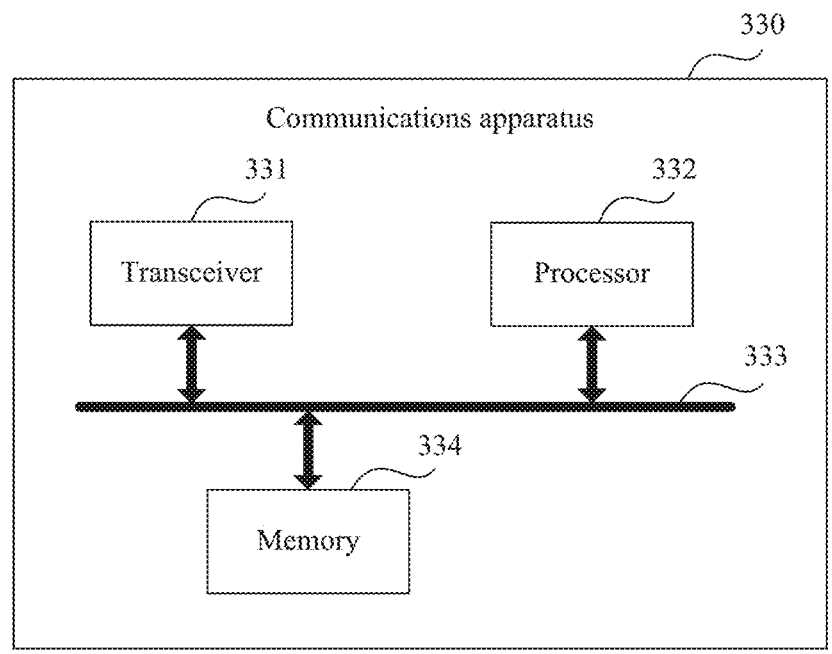
FIG. 22 is a schematic structural diagram of another communications apparatus according to an embodiment of this application.

Based on the foregoing embodiment and a same concept, an embodiment of this application provides a communications apparatus. The communications apparatus may be a sending apparatus or a chip in the sending apparatus, and is configured to implement a function implemented by the foregoing sending apparatus, and a corresponding procedure or step in the method embodiment shown in FIG. 20, for example, a corresponding procedure or step performed by a terminal device in the foregoing embodiment. The communications apparatus has a function of the sending apparatus 10 shown in FIG. 2. FIG. 22 is an example of a schematic structural diagram of a communications apparatus according to an embodiment of this application. As shown in FIG. 22, a communications apparatus 330 may include a transceiver 331 and a processor 332.

The transceiver 331 is configured to communicatively interact with another device. The transceiver 331 may be an RF circuit, a Wi-Fi module, a communications interface, a Bluetooth module, or the like. A receiving module and a sending module that are corresponding to the transceiver 331 may perform a method procedure performed by the receiving module and the sending module.

The processor 332 is configured to implement a function of a processing module, for example, a solution of performing N rounds of operations on a modulated signal to obtain an encoded signal.

Optionally, the communications apparatus 330 may further include a memory 334, configured to store a program and the like. Specifically, the program may include program code, and the program code includes an instruction. The memory 334 may include a RAM, and may further include a nonvolatile memory, such as at least one magnetic disk memory. The processor 332 executes the application program stored in the memory 334, to implement the foregoing function.

In a possible manner, the transceiver 331, the processor 332, and the memory 334 may be interconnected by using a bus 333. The bus 333 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 22, but this does not mean that there is only one bus or only one type of bus.

Figure 23:
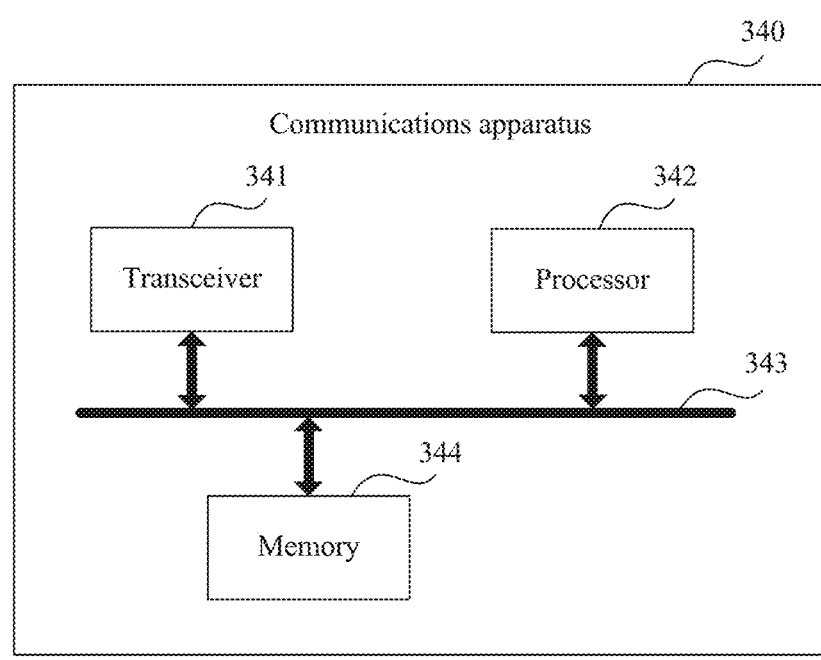
FIG. 23 is a schematic structural diagram of another communications apparatus according to an embodiment of this application.

Based on the foregoing embodiment and a same concept, an embodiment of this application provides a communications apparatus. The communications apparatus may be a receiving apparatus or a chip in the receiving apparatus, and is configured to implement a function implemented by the foregoing receiving apparatus, and a corresponding procedure or step in the method embodiment shown in FIG. 21, for example, a corresponding procedure or step performed by a network device in the foregoing embodiment. The communications apparatus has a function of the receiving apparatus 20 shown in FIG. 12. FIG. 23 is an example of a schematic structural diagram of a communications apparatus according to an embodiment of this application. As shown in FIG. 23, a communications apparatus 340 may include a transceiver 341 and a processor 342.

The transceiver 341 is configured to communicatively interact with another device. The transceiver 341 may be an RF circuit, a Wi-Fi module, a communications interface, a Bluetooth module, or the like. A receiving module and a sending module that are corresponding to the transceiver 341 may perform a method procedure performed by the receiving module and the sending module.

The processor 342 is configured to implement a function of a processing module, for example, a solution of performing processing based on an after-detection signal and an after-detection signal that is processed by a third delay module, to obtain a decoded signal.

Optionally, the communications apparatus 340 may further include a memory 344, configured to store a program and the like. Specifically, the program may include program code, and the program code includes an instruction. The memory 344 may include a RAM, and may further include a nonvolatile memory, such as at least one magnetic disk memory. The processor 342 executes the application program stored in the memory 344, to implement the foregoing function.

In a possible manner, the transceiver 341, the processor 342, and the memory 344 may be interconnected by using a bus 343. The bus 343 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 23, but this does not mean that there is only one bus or only one type of bus.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of the present invention.

A person of ordinary skill in the art may be aware that, illustrative logical blocks and steps described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may be or may not be physically separate, and parts displayed as units may be or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, all or a part of the procedures or functions in the embodiments of the present invention are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, comprising:
    modulating, by a transmitter, a received to-be-sent signal to obtain a modulated signal; and
    performing, by the transmitter, N rounds of operations on the modulated signal to obtain an encoded signal, wherein
    an output of a $1^{st}$-round operation in the N rounds of operations is determined based on the modulated signal and an output that is of an $N^{th}$-round operation and that is processed by a first delay circuit; and
    an output of an $i^{th}$-round operation in the N rounds of operations is determined based on an output of an $(i-1)^{th}$-round operation and an output that is of the $N^{th}$-round operation and that is processed by a second delay circuit, wherein N is a positive integer, and i is an integer greater than 1 and less than or equal to N, wherein a latency between an output and an input of the first delay circuit is one symbol period, or a latency between an output and an input of the second delay circuit is i symbol periods.

2. The method according to claim 1, wherein the output of the $1^{st}$-round operation is obtained by performing a first operation on the modulated signal and the output that is of the $N^{th}$-round operation and that is processed by the first delay circuit and performing a modulo operation on a result of the first operation, and the output of the $i^{th}$-round operation is obtained by performing a first operation on the output of the $(i-1)^{th}$-round operation and the output that is of the $N^{th}$-round operation and that is processed by the second delay circuit and performing the modulo operation on a result of the first operation; or the output of the $1^{t}$-round operation is obtained by performing an exclusive OR operation on the modulated signal and the output that is of the $N^{th}$-round operation and that is processed by the first delay circuit, and the output of the $i^{th}$-round operation is obtained by performing an exclusive OR operation on the output of the $(i-1)^{th}$-round operation and the output that is of the Nth-round operation and that is processed by the second delay circuit.

3. The method according to claim 2, wherein the modulating the received to-be-sent signal comprises:

performing, by the transmitter, M-level pulse amplitude modulation PAM-M modulation on the received to-be-sent signal, wherein the modulo operation comprises performing a modulo operation on M by using the result of the first operation.

4. The method according to claim 3, wherein N is determined based on M and a target level quantity of a receive end equalizer in a receiver.

5. The method according to claim 4, wherein after the transmitter obtains the encoded signal, the method further comprises:

if a noise non-whitening degree in a to-be-restored signal received by the receiver is determined to be greater than a degree threshold, sending, by the transmitter, the encoded signal to the receiver; or if the noise non-whitening degree in the to-be-restored signal received by the receiver is not greater than a degree threshold, sending, by the transmitter, the modulated signal to the transmitter.

6. The method according to claim 5, further comprises:

receiving indication information that indicates a value relationship between the noise non-whitening degree in the to-be-restored signal received by receiver and the degree threshold; and determining, according to the indication information, whether the noise non-whitening degree in the to-be-restored signal received by the receiver is greater than the degree threshold.

7. A communication method, comprising:

performing, by a receiver, maximum likelihood detection processing on a received to-be-restored signal to obtain an after-detection signal; and performing, by the receiver, processing based on the after-detection signal and the after-detection signal that is processed by a third delay circuit, to obtain a decoded signal, wherein the performing, by the receiver, processing based on the after-detection signal and the after-detection signal that is processed by a third delay circuit, to obtain a decoded signal comprises:

performing, by the receiver, a second operation on the after-detection signal and the after-detection signal that is processed by the third delay circuit, and performing a modulo operation on a result of the second operation to obtain the decoded signal; or performing, by the receiver, P rounds of exclusive OR operations on the after-detection signal and the after-detection signal that is processed by the third delay circuit, and using a signal output in a $P^{th}$-round exclusive OR operation as the decoded signal, wherein an output of a $1^{st}$-round exclusive OR operation in the P rounds of exclusive OR operations is determined based on the after-detection signal and the after-detection signal that is processed by a fourth delay circuit, and an output of a $j^{th}$-round exclusive OR operation in the P rounds of exclusive OR operations is determined based on an output of a $(j-1)^{th}$-round exclusive OR operation and the after-detection signal that is processed by a fifth delay circuit, wherein j is an integer greater than 1 and less than or equal to P, and P is a positive integer.

8. The method according to claim 7, wherein a latency between an output and an input of the fourth delay circuit is one symbol period; or a latency between an output and an input of the fifth delay circuit is j symbol periods.

9. The method according to claim 8, wherein a latency between an output and an input of the third delay circuit is N symbol periods, and N is determined based on M and a target level quantity of a receive end equalizer in the receiver; and M-level pulse amplitude modulation PAM-M modulation is performed on the to-be-restored signal in a transmitter.

10. The method according to claim 9, wherein the modulo operation comprises performing a modulo operation on M by using the result of the second operation.

11. The method according to claim 10, wherein the method further comprises:

if a noise non-whitening degree in the to-be-restored signal received by the receiver is greater than a degree threshold, demodulating the decoded signal to obtain a restored signal; or if a noise non-whitening degree in the to-be-restored signal received by the receiver is not greater than a degree threshold, demodulating the after-detection signal to obtain a restored signal.

12. The method according to claim 11, further comprising:

performing, by the receiver, judgement processing on the to-be-restored signal to obtain an after judgement signal;

estimating, by the receiver, a noise whitening tap coefficient in the to-be-restored signal based on the after-judgement signal and the to-be-restored signal; and determining a value relationship between the noise non-whitening degree in the to-be-restored signal and the degree threshold based on a value relationship between the noise whitening tap coefficient and a judgement threshold.

13. The method according to claim 12, wherein after the determining, by the receiver, the value relationship between the noise non-whitening degree in the to-be-restored signal and the degree threshold, the method further comprises:

sending, by the receiver to the transmitter, indication information that indicates the value relationship between the noise non-whitening degree in the to-be-restored signal received by the receiver and the degree threshold.

14. A communications apparatus, comprising:
a processor, configured to: modulate a received to-be-sent signal to obtain a modulated signal, and perform N rounds of operations on the modulated signal to obtain an encoded signal; and
a transceiver, configured to send the encoded signal, wherein
an output of a $1^{st}$-round operation in the N rounds of operations is determined based on the modulated signal and an output that is of an $N^{th}$-round operation and that is processed by a first delay circuit; and
an output of an $i^t$-round operation in the N rounds of operations is determined based on an output of an $(i-1)^t$-round operation and an output that is of the $N^{th}$-round operation and that is processed by a second delay circuit, wherein N is a positive integer, and i is an integer greater than 1 and less than or equal to N, wherein
a latency between an output and an input of the first delay circuit is one symbol period, or a latency between an output and an input of the second delay circuit is i symbol periods.

15. The apparatus according to claim 14, wherein the output of the $1^{st}$-round operation is obtained by performing a first operation on the modulated signal and the output that is of the $N^{th}$-round operation and that is processed by the first delay circuit and performing a modulo operation on a result of the first operation, and the output of the $i^{th}$-round operation is obtained by performing a first operation on the output of the $(i-1)^{th}$-round operation and the output that is of the $N^{th}$-round operation and that is processed by the second delay circuit and performing the modulo operation on a result of the first operation; or the output of the $1^{st}$-round operation is obtained by performing an exclusive OR operation on the modulated signal and the output that is of the $N^{th}$-round operation and that is processed by the first delay circuit, and the output of the $i^{th}$-round operation is obtained by performing an exclusive OR operation on the output of the $(i-1)^{th}$-round operation and the output that is of the $N^{th}$-round operation and that is processed by the second delay circuit.

16. The apparatus according to claim 15, wherein the processor is configured to:
perform M-level pulse amplitude modulation PAM-M modulation on the received to-be-sent signal, wherein the modulo operation comprises performing a modulo operation on M by using the result of the first operation.

17. The apparatus according to claim 16, wherein N is determined based on M and a target level quantity of a receive end equalizer in a receiver.

* * * * *